(12) United States Patent
Liao et al.

(10) Patent No.: US 12,285,876 B2
(45) Date of Patent: Apr. 29, 2025

(54) CLEANING ROBOT CAPABLE OF ELIMINATING REFLECTION INTERFERENCE

(71) Applicant: PixArt Imaging Inc., Hsin-Chu County (TW)

(72) Inventors: Chi-Chieh Liao, Hsin-Chu County (TW); Guo-Zhen Wang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 340 days.

(21) Appl. No.: 17/882,648

(22) Filed: Aug. 8, 2022

(65) Prior Publication Data

US 2022/0369886 A1 Nov. 24, 2022

Related U.S. Application Data

(63) Continuation-in-part of application No. 17/470,401, filed on Sep. 9, 2021, now Pat. No. 11,565,423, which is a continuation of application No. 16/157,096, filed on Oct. 11, 2018, now Pat. No. 11,141,863.

(51) Int. Cl.
| | |
|---|---|
| *B25J 9/00* | (2006.01) |
| *A47L 9/28* | (2006.01) |
| *A47L 11/24* | (2006.01) |
| *A47L 11/40* | (2006.01) |
| *B25J 9/16* | (2006.01) |
| *B25J 11/00* | (2006.01) |

(52) U.S. Cl.
CPC .......... *B25J 9/1697* (2013.01); *A47L 9/2826* (2013.01); *A47L 11/24* (2013.01); *A47L 11/40* (2013.01); *A47L 11/4061* (2013.01); *B25J 9/1666* (2013.01); *B25J 11/0085* (2013.01); *A47L 2201/04* (2013.01)

(58) Field of Classification Search
CPC .... B25J 9/1697; B25J 9/1666; B25J 11/0085; A47L 11/4061; A47L 9/2826; A47L 2201/04; A47L 9/30; A47L 2201/06; A47L 11/24; A47L 11/40; A47L 11/4002; A47L 11/4011; G01S 17/48; G01S 7/4815; G01S 17/931; G01S 17/88; G05D 1/0238; G05D 2201/0203; G05D 1/021; G05D 1/0246
See application file for complete search history.

(56) References Cited

U.S. PATENT DOCUMENTS 6,597,430 B1 * 7/2003 Nishi .................. G03F 7/70583
355/53

* cited by examiner

*Primary Examiner* — Ian Jen
(74) *Attorney, Agent, or Firm* — WPAT, PC

(57) ABSTRACT

There is provided a cleaning robot including a light source module and an image sensor. The light source module projects a horizontal line pattern toward a moving direction. The image sensor captures, toward the moving direction, an image of the horizontal line pattern. The light source module is arranged below the image sensor so as to eliminate the interference from second reflection.

18 Claims, 20 Drawing Sheets

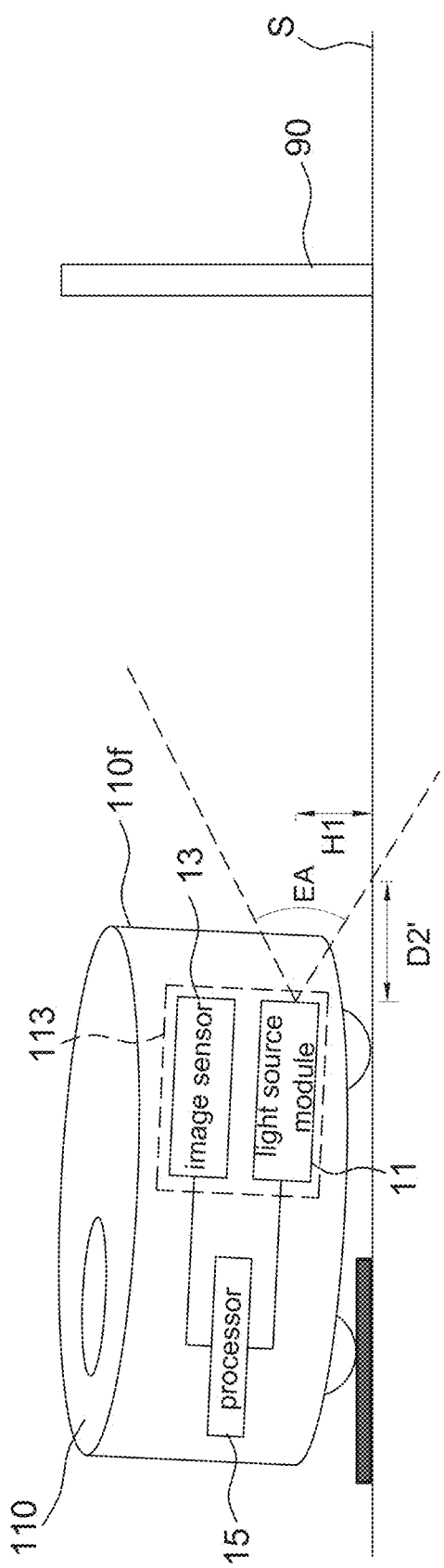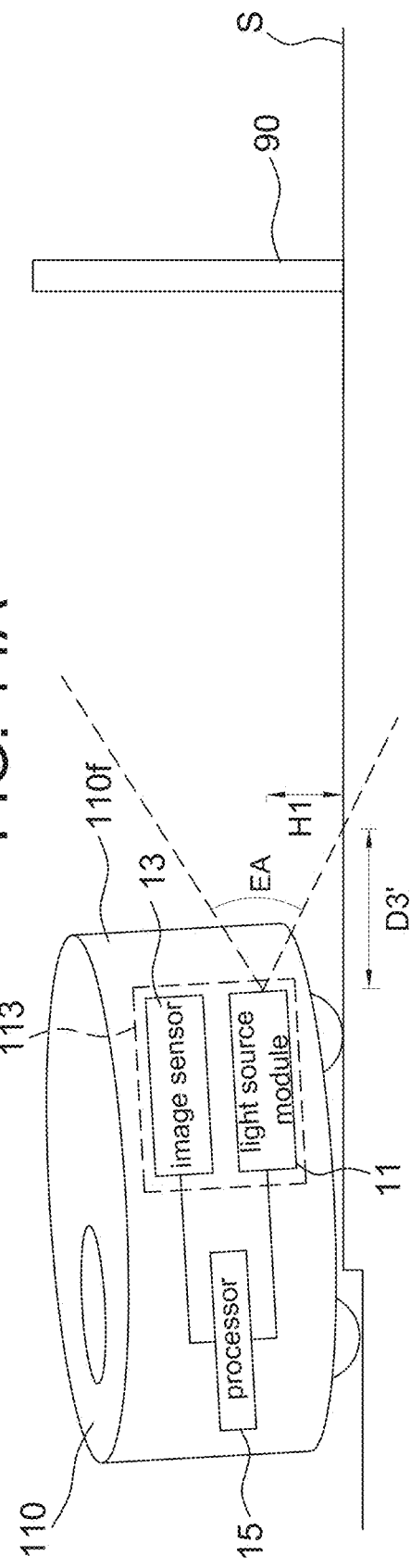

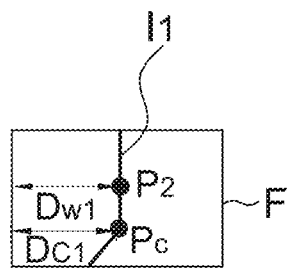 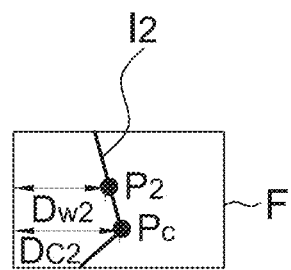 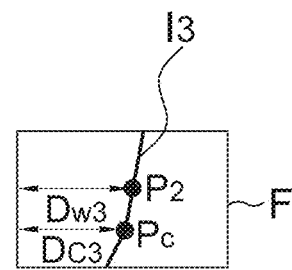
FIG. 15A  FIG. 15B  FIG. 15C
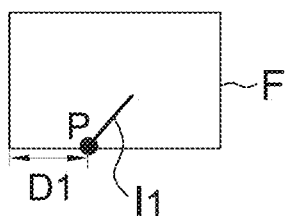 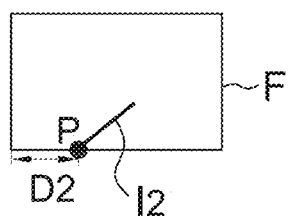 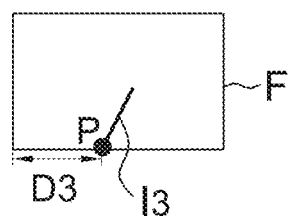
FIG. 16A  FIG. 16B  FIG. 16C

CLEANING ROBOT CAPABLE OF ELIMINATING REFLECTION INTERFERENCE

The present application is a continuation-in-part application of U.S. patent application Ser. No. 17/470,401 filed on, Sep. 9, 2021, which is a continuation application of U.S. patent application Ser. No. 16/157,096 filed on Oct. 11, 2018, the disclosures of which are hereby incorporated by reference herein in their entirety.

BACKGROUND

1. Field of the Disclosure

This disclosure generally relates to an optical navigation device and, more particularly, to an optical cleaning robot capable of eliminating reflection interference from a work surface or an obstacle surface and identifying whether a work surface is horizontal or not.

2. Description of the Related Art

Nowadays, a trend is irreversible in factory to replace human workers by machines. Even at home, because one can have more free time by using robots to do homework, various types of family robots are also created during which the cleaning robot is most well-known and popular.

The cleaning robot has sensors for detecting obstacles in front. However, the conventional cleaning robot can only detect one-dimensional depth information but is unable to identify the appearance of the obstacles.

In addition, the cleaning robot is also required to be able to calculate a wall distance when cleaning along a wall so as to efficiently clean corners. The conventional cleaning robot adopts multiple different sensors to respectively detect the front distance and the wall distance. However, field of views between said different sensors general have dead zones unable to detect any obstacle such that the conventional cleaning robot frequently bumps to different obstacles during operation. Not only generating noises, the bumping can further cause damages to furniture and the robot itself to shorten the service lifetime thereof.

Accordingly, it is necessary to provide a cleaning robot capable of calculating both one-dimensional and two-dimensional depth information according to images captured by an image sensor, and further calculating a distance from a side wall accordingly.

SUMMARY

The present disclosure provides a cleaning robot capable of detecting two-dimensional depth information, and an operating method of the cleaning robot.

The present disclosure further provides a navigation device with a distance identification not being influenced by the material of a work surface.

The present disclosure provides a cleaning robot including a housing front edge, a light source module and an image sensor. The housing front edge is located on a side of the cleaning robot toward a moving direction. The light source module is configured to project a horizontal line pattern toward the moving direction and perpendicular to the housing front edge. The image sensor is configured to acquire an image of the horizontal line pattern toward the moving direction, wherein the light source module is arranged at a position lower than the image sensor.

The present disclosure further provides a cleaning robot including a light source module and an image sensor. The light source module is configured to project a horizontal line pattern on a work surface at a predetermined distance in a moving direction. The image sensor is configured to acquire an image of the horizontal line pattern toward the moving direction, wherein the light source module is arranged at a position lower than the image sensor.

The present disclosure further provides a cleaning robot including a first light source, a second light source and an image sensor. The first light source is configured to project a horizontal line pattern toward a moving direction via a first diffractive optical element. The second light source is configured to project a speckle pattern toward the moving direction via a second diffractive optical element. The image sensor is configured to acquire, toward the moving direction, an image of the horizontal line pattern and an image of the speckle pattern, wherein the first light source is arranged at a position lower than the image sensor.

The present disclosure further provides a cleaning robot including light source module, an image sensor and a processor. The light source module is configured to project a vertical line pattern toward a moving direction. The image sensor is configured to acquire an image of the vertical line pattern toward the moving direction, wherein a first part of the vertical line pattern is projected on a work surface, and a second part of the vertical line pattern is projected on an obstacle surface. The processor is configured to identify an inclined state of the cleaning robot according to a distance relationship between a connection point between associated images of the first part as well as the second part in the image of the vertical line pattern and a predetermined point of the associated image of the second part in the image of the vertical line pattern.

The present disclosure further provides a cleaning robot including light source module, an image sensor and a processor. The light source module is configured to project a vertical line pattern toward a moving direction. The image sensor is configured to acquire an image of the vertical line pattern toward the moving direction. The processor is configured to identify an inclined state of the cleaning robot according to a distance variation of a predetermined point in the image of the vertical line pattern.

The present disclosure further provides a cleaning robot including light source module, an image sensor and a processor. The light source module is configured to project a horizontal line pattern toward a moving direction. The image sensor is configured to acquire a first image frame and a second image frame containing the horizontal line pattern toward the moving direction. The processor, configured to calculate a first gravity line of a first line pattern image in a first window of interest (WOI) in the first image frame, calculate a second gravity line of a second line pattern image in a second WOI in the second image frame, wherein the second WOI is determined according to a top point of the first gravity line, and combine the first gravity line and the second gravity line to generate an output gravity line.

In the cleaning robot and the operating method of the present disclosure, according to different applications, the line pattern and the speckle pattern are overlapped or not overlapped with each other, and the line pattern and the speckle pattern are generated simultaneously or sequentially.

In the cleaning robot and the operating method of the present disclosure, according to different applications, the light source module emits light of a single dominant wavelength to generate the line pattern and the speckle pattern, or the light source module emits light of different dominant wavelengths to respectively generate the line pattern and the speckle pattern.

In the cleaning robot and the operating method of the present disclosure, the image sensor includes a linear pixel array. The processor controls the cleaning robot to move in a direction parallel to an obstacle at a substantially fixed wall distance according to an image size of the obstacle captured by the linear pixel array.

In the cleaning robot and the operating method of the present disclosure, the image sensor includes a wide-angle lens to allow a field of view of the image sensor to be larger than a diameter of the cleaning robot. Accordingly, when the cleaning robot operates in a direction parallel to a wall, the image sensor still can continuous detect an image of the side wall to identify whether a wall distance is changed. Therefore, the cleaning robot of the present disclosure needs not to adopt another sensor to detect the wall distance, and the problem of unable to detect dead zones is eliminated.

BRIEF DESCRIPTION OF THE DRAWINGS

Other objects, advantages, and novel features of the present disclosure will become more apparent from the following detailed description when taken in conjunction with the accompanying drawings.

FIG. 14A is a schematic diagram of a cleaning robot operated in forward inclined state according to one embodiment of the present disclosure.

FIG. 14B is a schematic diagram of a cleaning robot operated in posterior inclined state according to one embodiment of the present disclosure.

FIGS. 15A to 15C are schematic diagrams of an image frame acquired by a cleaning robot operated in different states according to some embodiments of the present disclosure.

FIGS. 16A to 16C are other schematic diagrams of an image frame acquired by a cleaning robot operated in different states according to some embodiments of the present disclosure.

DETAILED DESCRIPTION OF THE EMBODIMENT

It should be noted that, wherever possible, the same reference numbers will be used throughout the drawings to refer to the same or like parts.

Figure 1:
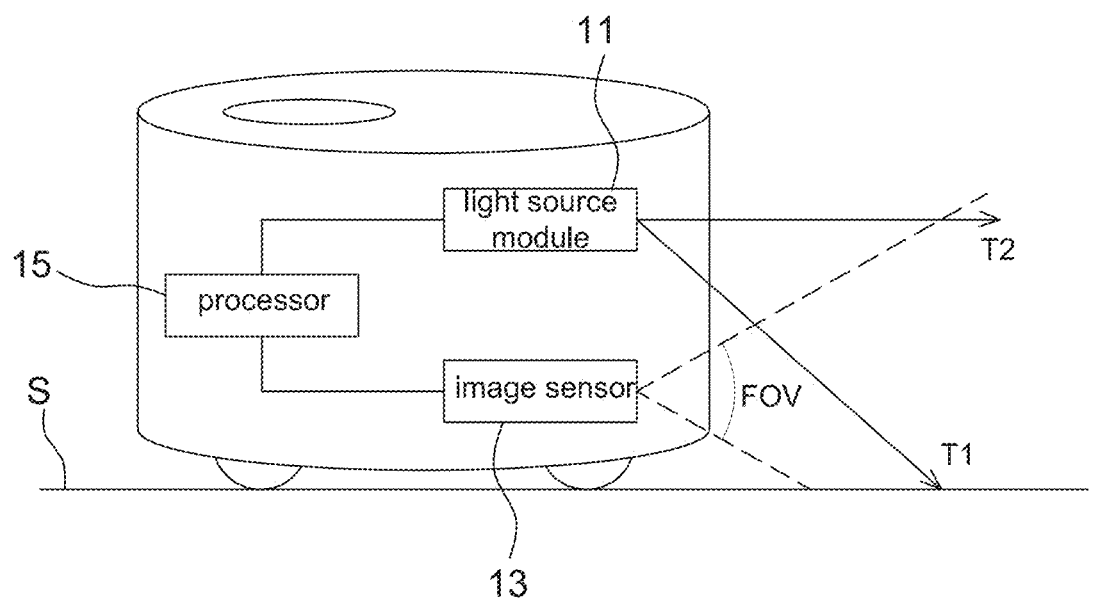
FIG. 1 is a schematic block diagram of a cleaning robot according to one embodiment of the present disclosure.

Referring to FIG. 1, it is a schematic block diagram of a cleaning robot 100 according to one embodiment of the present disclosure. The cleaning robot 100 is used to clean a work surface S (e.g., a floor) by operating on the work surface S. The cleaning method can use the conventional method, and details thereof are not described herein.

The cleaning robot 100 of the present disclosure includes a light source module 11, an image sensor 13 and a processor 15 electrically coupled to the light source module 11 and the image sensor 13. The light source module 11 includes at least one active light source, and is used to provide or project a line pattern T1 and a speckle pattern T2 toward a front of a moving direction (e.g., the right of FIG. 1) of the cleaning robot 100. In one non-limiting embodiment, the line pattern T1 is projected downward on the work surface S and the speckle pattern T2 is projected in a front direction, but the present disclosure is not limited thereto. As long as the line pattern T1 is projected with a tilt angle (i.e. not parallel to the work surface S), the processor 15 is able to calculate a relative distance from the projected object by using triangulation method. More specifically, in the present disclosure, a projected angle of the line pattern T1 is different from a projected angle of the speckle pattern T2.

Figure 2:
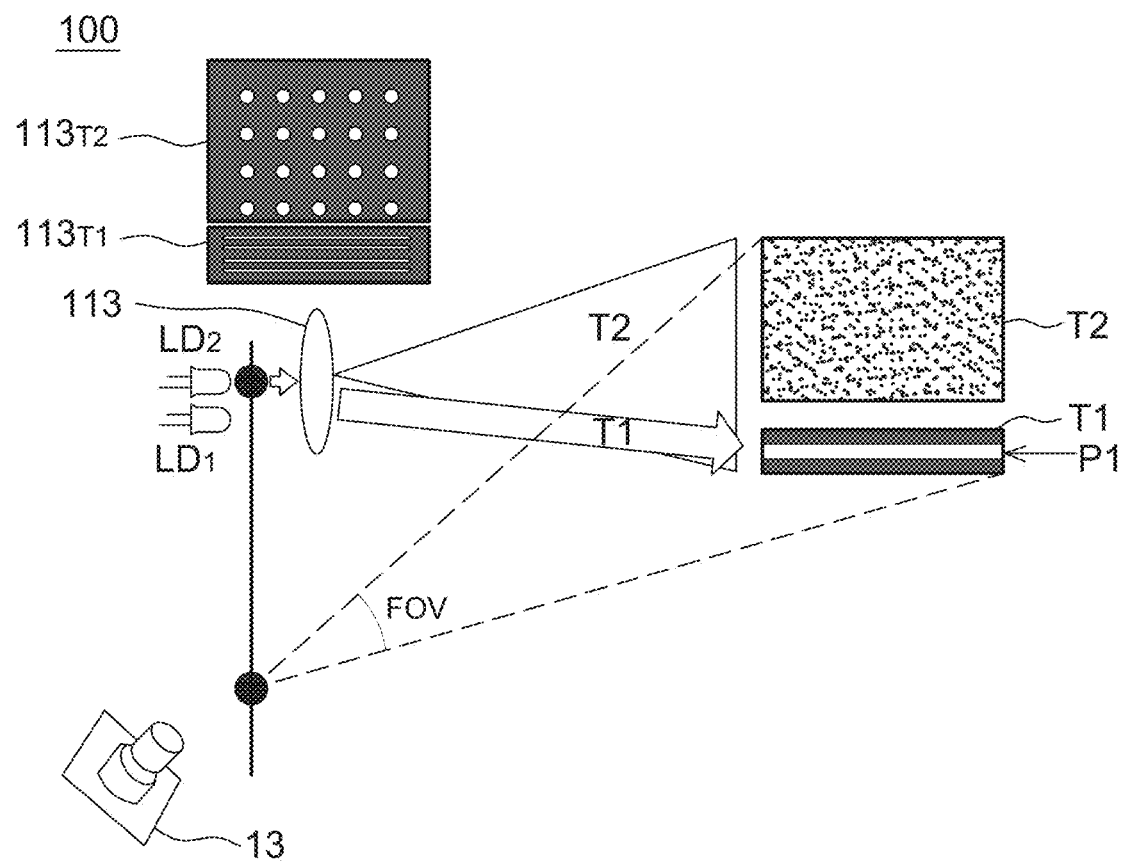
FIG. 2 is an operational schematic diagram of a cleaning robot according to one embodiment of the present disclosure.

Referring to FIG. 2, it is an operational schematic diagram of a cleaning robot 100 according to one embodiment of the present disclosure. In this embodiment, the light source module 11 includes at least one coherent light source (e.g., a laser diode) or a partially coherent light source, and at least one diffractive optical element (DOE) 113 used to generate a line pattern T1 and a speckle pattern T2. For example, FIG. 2 shows that the diffractive optical element 113 is composed of a first diffractive optical element $113_{T1}$ and a second diffractive optical element $113_{T2}$.

FIG. 2 shows that the light source module 11 includes a first light source LD1, the first diffractive optical element $113_{T1}$, a second light source LD2 and the second diffractive optical element $113_{T2}$. In one non-limiting embodiment, the first diffractive optical element $113_{T1}$ and the second diffractive optical element $113_{T2}$ are combined together (e.g., by glue) to form a module to be easily arranged in front of the light source. In other arrangement, the first diffractive optical element $113_{T1}$ and the second diffractive optical element $113_{T2}$ are disposed at different positions.

The first light source LD1 is arranged opposite to the first diffractive optical element $113_{T1}$ and used to emit light to pass through the first diffractive optical element $113_{T1}$ to project a line pattern T1 in front of a moving direction of the cleaning robot 100. The second light source LD2 is arranged opposite to the second diffractive optical element $113_{T2}$ and used to emit light to pass through the second diffractive optical element $113_{T2}$ to project a speckle pattern T2 in front of the moving direction of the cleaning robot 100, wherein sizes and shapes of the speckles in the speckle pattern are not particularly limited as long as a plurality of speckles of identical or different shapes are generated on a projected surface.

FIG. 2 shows that the cleaning robot 100 includes a single image sensor 13 which has a field of view FOV covering regions of the line pattern T1 and the speckle pattern T2. The image sensor 13 is a CMOS image sensor, a CCD image sensor or other elements capable of detecting light energy and generating electrical signals. The image sensor 13 is used to capture and acquire an image of the line pattern T1 and an image of the speckle pattern T2, and then send the captured images to the processor 15 for post-processing, e.g., identifying the distance (so called depth) and the shape (so called two-dimensional depth information) of the obstacle.

Figure 3:
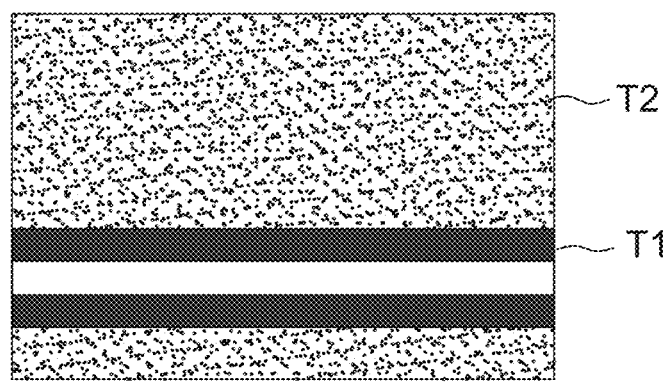
FIG. 3 is a schematic diagram of a pattern arrangement projected by a cleaning robot according to one embodiment of the present disclosure.

In FIG. 2, although the line pattern T1 is shown to be formed outside of a region of the speckle pattern T2, the present disclosure is not limited thereto. In FIG. 3, the line pattern T1 is shown to be formed within a region of the speckle pattern T2. In FIGS. 2 and 3, the positional relationship and the scale ratio between the line pattern T1 and the speckle pattern T2 are only intended to illustrate but not to limit the present disclosure. It is possible to form the line pattern T1 at the upper side, left side or right side of the speckle pattern T2 as long as they are detectable by the image sensor 13.

Figure 4A:
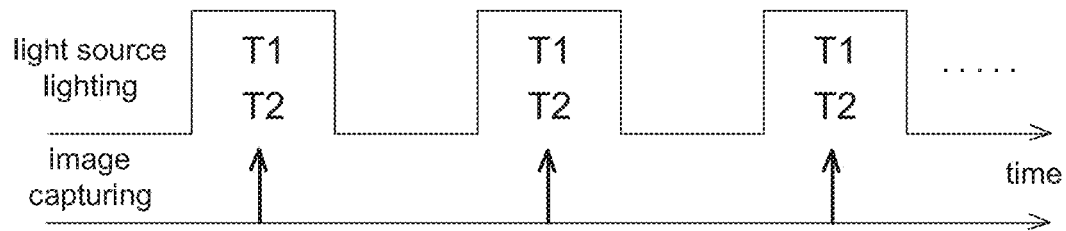
FIGS. 4A-4C are timing diagrams of projecting two different patterns by a cleaning robot according to one embodiment of the present disclosure.
Figure 4B:
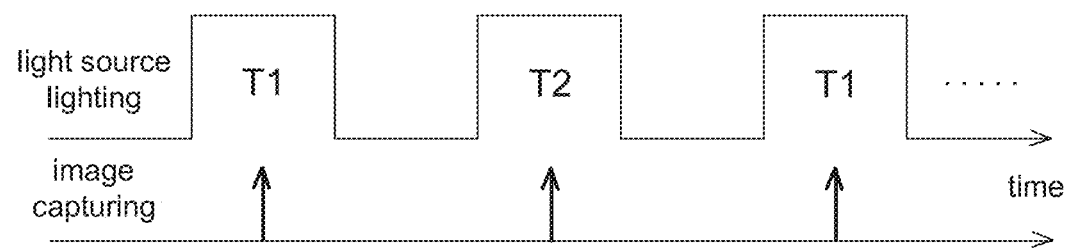
Figure 4C:
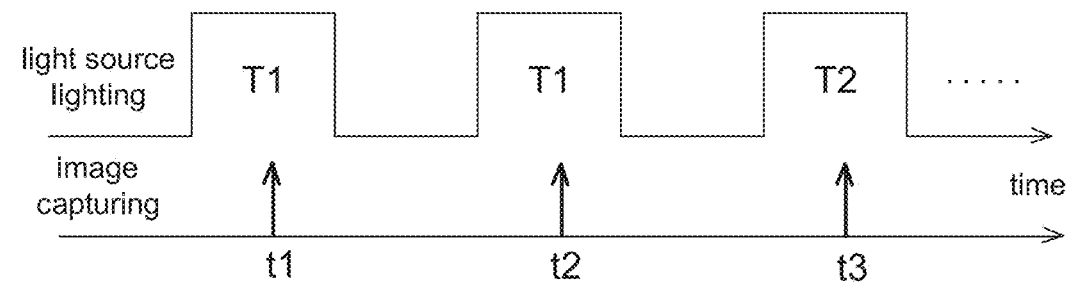

Referring to FIGS. 4A-4C, they are timing diagrams of two different patterns T1 and T2 projected by the cleaning robot 100 of the present disclosure.

When the line pattern T1 and the speckle pattern T2 are overlapped with each other as shown in FIG. 3, in one embodiment the first light source LD1 and the second light source LD2 are turned on sequentially (as shown in FIG. 4B) to respectively generate the line pattern T1 and the speckle pattern T2 at different time points. In this embodiment, as the light sources are lighted separately, the line pattern T1 and the speckle pattern T2 do not interfere with each other, and thus the first light source LD1 and the second light source LD2 have identical or different dominant wavelengths without particular limitations.

In another embodiment, the line pattern T1 and the speckle pattern T2 are overlapped with each other and the first light source LD1 and the second light source LD2 are turned on simultaneously (as shown in FIG. 4A). In order to allow the line pattern T1 and the speckle pattern T4 to not interfere with each other, preferably a dominate wavelength of the first light source LD1 is different from a dominant wavelength of the second light source LD2. In this case, a part of pixels of the image sensor 13 are covered by a light filter for detecting the line pattern T1, and the other part of pixels are covered by another light filter for detecting the speckle patter T2. The method for forming light filters on pixels is known to the art, and thus details thereof are not described herein.

In the embodiment of FIG. 2, as the line pattern T1 and the speckle pattern T2 are not overlapped, they do not interfere with each other. Accordingly, the first light source LD1 and the second light source LD2 are arranged, according to different applications, to be turned on simultaneously or sequentially, and have identical or different dominant wavelengths.

The processor 15 is, for example, a digital signal processor (DSP), a microcontroller unit (MCU), a central processing unit (CPU) or an application specific integrated circuit (ASIC) that identify, by software and/or hardware, whether there is an obstacle (e.g., wall, table legs, chair legs or lower part of other furniture or home appliances) according to an image containing the line pattern T1, and identify the appearance (referred to two-dimensional depth information) of the obstacle according to an image containing the speckle pattern T2.

For example referring to FIG. 2, if there is no obstacle within the FOV of the image sensor 13, a line section in the image of the line pattern T1 captured by the image sensor 13 is a horizontal line at a position P1.

When an obstacle smaller than a range of the FOV exists within the FOV, a part of the line section in the image of the line pattern T1 appears at a different height (i.e. not at the position P1). Accordingly, the processor 15 identifies that there is an obstacle in front according to line sections at different positions.

When an obstacle larger than a range of the FOV exists within the FOV, the whole of the line section in the image of the line patter T1 appears at a different height, e.g., moving upward or downward from the position P1 which is determined according to relative positions between the light source module 11 and the image sensor 13. Accordingly, the processor 15 identifies that there is an obstacle in front according to a position shifting of the line section. In addition, the processor 15 further identifies a distance from the obstacle according to the height (or a shifting amount) of the line section in the image of the line pattern T1. For example, the cleaning robot 100 further includes a memory for storing a relationship between positions of the line section and distances from the obstacle (e.g., forming a look up table, LUT). When identifying a position of the line section in the image of the line pattern T1, the processor 15 compares the calculated position with the stored information to obtain a distance of the obstacle (also adaptable to the case that a part of the line section appears at different positions).

To reduce the consumption power and increase the accuracy, when the processor 15 identifies no obstacle in the image of the line pattern T1, preferably only the first light source LD1 is turned on but the second light source LD2 is not turned on. For example, FIG. 4C shows that the processor 15 does not detect an obstacle at a first time t1, and thus only the first light source LD1 is turned on at a second time t2. When an obstacle is detected at the second time t2, the second light source LD2 is turned on at a third time t3 (the first light source LD1 being turned on optionally) to cause the image sensor 13 to acquire an image of the speckle pattern T2. The processor 15 then identifies an appearance of the obstacle according to the image of the speckle pattern T2. For example, the processor 15 calculates the appearance of the obstacle as two-dimensional depth information according to the variation of sizes and shapes of speckles on a surface of the obstacle, e.g., by comparing with the stored information. The two-dimensional depth information is used as data for avoiding bumping an object and constructing a map of the cleaned area.

In the above embodiment, a cleaning robot 100 having only one image sensor 13 is taken as an example to illustrate the present disclosure, and the image sensor 13 captures images of both the line pattern T1 and the speckle pattern T2. In another non-limiting embodiment, the cleaning robot 100 includes a first image sensor for capturing an image of the line pattern T1 and a second image sensor for capturing an image of the speckle pattern T2 to reduce the interference therebetween. In this embodiment, arrangements of the first light source LD1, the first diffractive optical element $113_{T1}$, the second light source LD2 and the second diffractive optical element $113_{T2}$ are not changed, and thus details thereof are not repeated herein.

The first image sensor and the second image sensor acquire images respectively corresponding to operations of the first light source LD1 and the second light source LD2. For example, the first light source LD1 and the second light source LD2 emit light sequentially, and the first image sensor and the second image sensor respectively capture images of the line pattern T1 and the speckle patter T2 corresponding to the lighting of the first light source LD1 and the second light source LD2. In this embodiment, the line pattern T1 and the speckle pattern T2 are overlapped or not overlapped with each other, and dominant wavelengths of the first light source LD1 and the second light source LD2 are identical or different.

In another embodiment, the first light source LD1 and the second light source LD2 are turned on simultaneously. If the line pattern T1 and the speckle pattern T2 are not overlapped with each other, a dominant wavelength of the first light source LD1 is identical to or different from that of the second light source LD2 without particular limitations. However, if the line pattern T1 and the speckle pattern T2 are overlapped with each other, the dominant wavelength of the first light source LD1 is preferably different from that of the second light source LD2 to avoid interference. In this case, the first image sensor has a light filter to block light instead of the dominant wavelength of the first light source LD1, and the second image sensor has a light filter to block the light instead of the dominant wavelength of the second light source LD2.

The processor 15 is electrically coupled to the first image sensor and the second image sensor, and used to identify whether there is an obstacle according to the image of the line pattern T received from the first image sensor, and identify the appearance of the obstacle according to the image of the speckle pattern T2 received from the second image sensor.

Similarly, to reduce the power consumption and increase the accuracy, when the processor 15 identifies that there is no obstacle in a moving direction according to the image of the line patter T1, only the first light source LD1 and the first image sensor are turned on, but the second light source LD2 and the second image sensor are not turned on as shown in FIG. 4C. The second light source LD2 and the second image sensor are turned on only when an obstacle is detected by the processor 15. When the appearance of the obstacle is depicted by the processor 15 according to the image of the speckle pattern T2, the second light source LD2 and the second image sensor are turned off.

In another embodiment, when moving in a direction parallel to the obstacle (e.g., a wall) at a predetermined distance, the cleaning robot 100 of the present disclosure captures the image of the line pattern T1 using the same image sensor 13 to maintain a wall distance without using other sensors.

Figure 5:
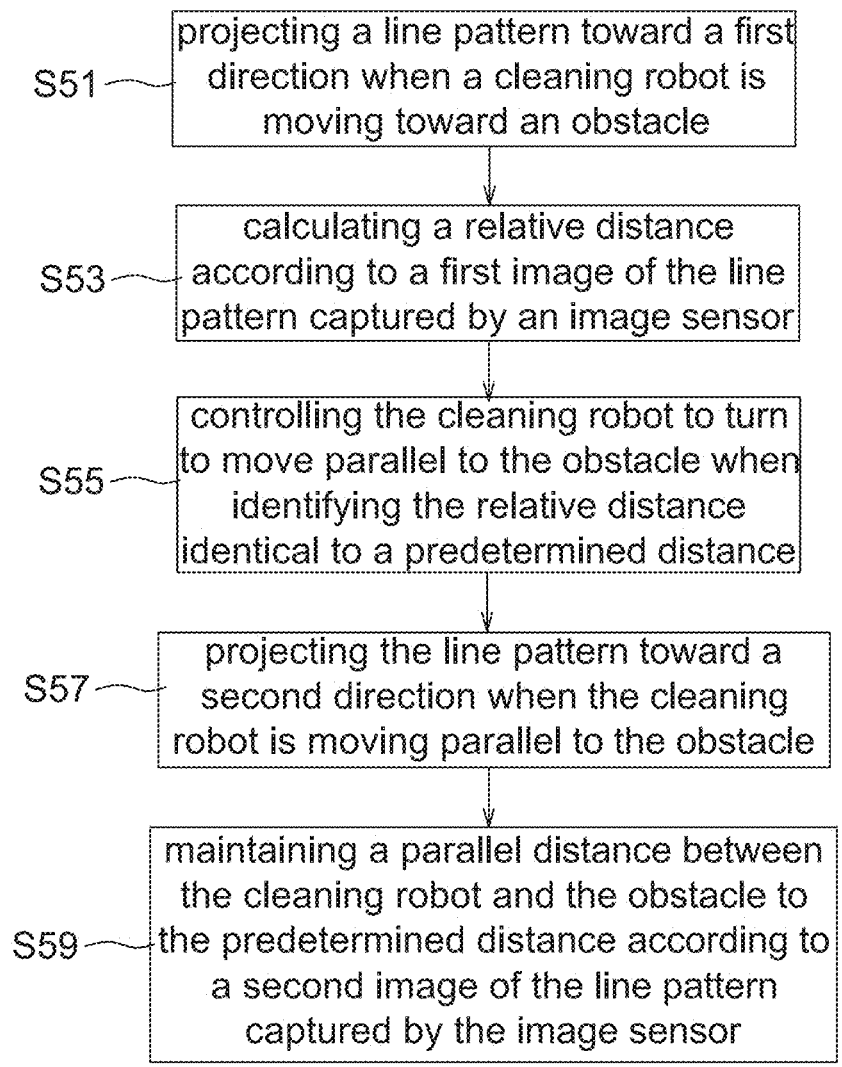
FIG. 5 is a flow chart of an operating method of a cleaning robot according to one embodiment of the present disclosure.

For example referring to FIG. 5, it is a flow chart of an operating method of a cleaning robot 100 according to one embodiment of the present disclosure. The operating method includes the steps of: projecting a line pattern toward a first direction when a cleaning robot moves toward an obstacle (Step S51); calculating, by a processor, a relative distance from the obstacle according to a first image of the line pattern captured by an image sensor (Step S53); controlling, by the processor, the cleaning robot to turn to move parallel to the obstacle when the relative distance is identical to a predetermined distance (Step S55); projecting the line pattern toward a second direction when the cleaning robot moves parallel to the obstacle (Step S57); and maintaining, by the processor, a parallel distance between the cleaning robot and the obstacle to the predetermined distance according to a second image of the line pattern captured by the image sensor (Step S59).

Figure 6A:
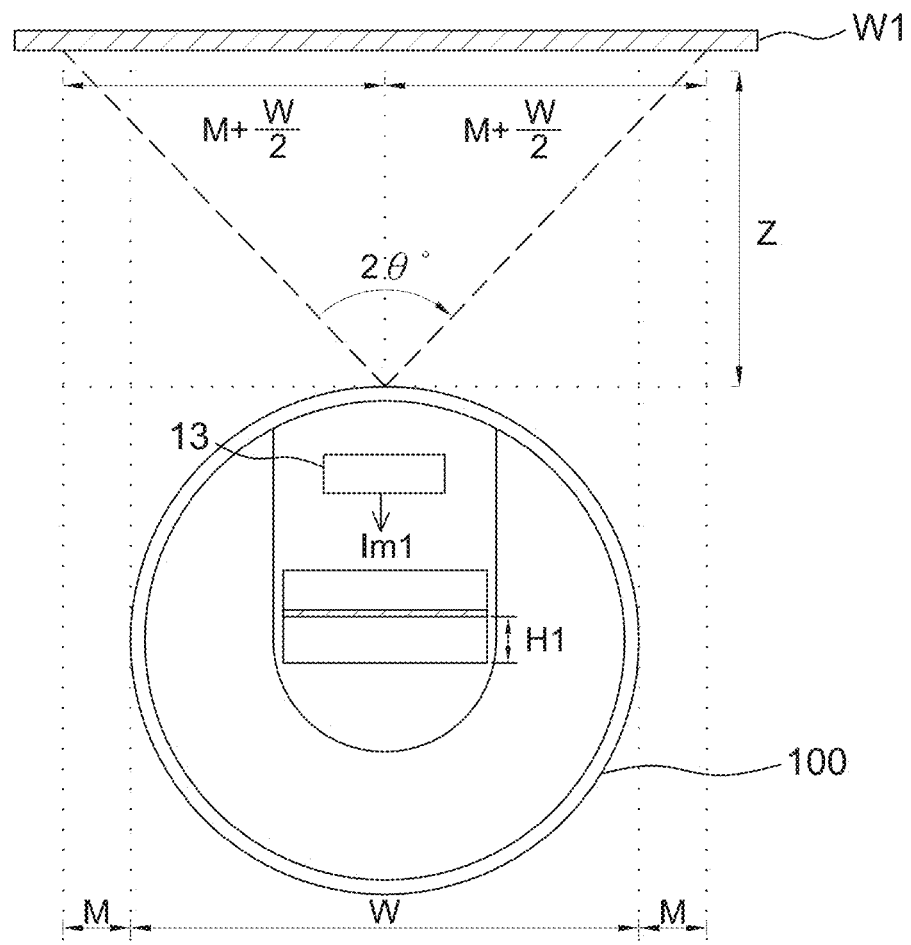
FIGS. 6A-6B are operational schematic diagrams of a cleaning robot according to one embodiment of the present disclosure.
Figure 6B:
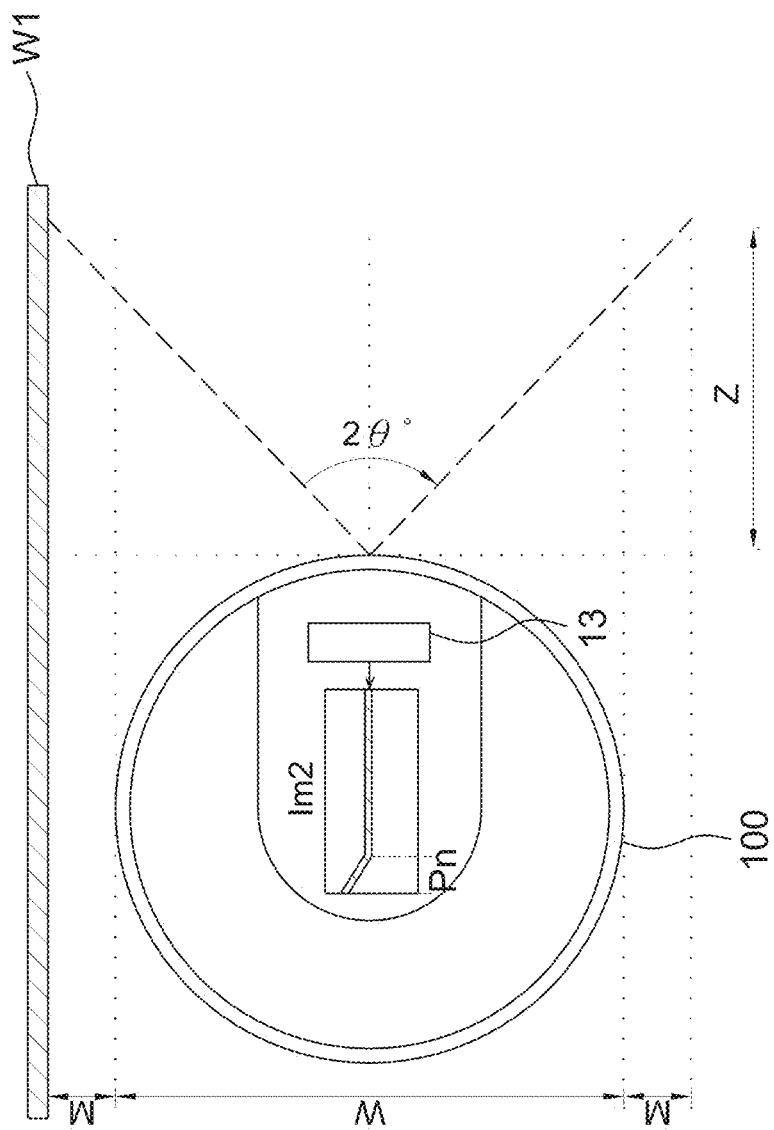

The operating method herein is adaptable to the above embodiments having a single image sensor and two image sensors, respectively. Referring to FIGS. 6A-6B together, one embodiment of the operating method of the present disclosure is described hereinafter.

Step S51: Firstly, the cleaning robot 100 is moving toward an obstacle W1 (e.g., a wall). The first light source LD1 emits light to go through the first DOE $113_{T1}$ to project a line pattern T1 toward a first direction (i.e., toward the obstacle W1). In this embodiment, it is assumed that a projected distance of the line pattern T1 is Z. The image sensor 13 then captures a first image Im1 containing the line pattern T1 as shown in FIG. 6A.

As mentioned above, when the processor 15 identifies that there is at least one obstacle in the captured first image Im1 (the line section therein being moved or broken), the operating method further includes the steps of: controlling the second light source LD2 to emit light to go through the second DOE $113_{T2}$ to project a speckle pattern T2 toward the obstacle W1; and processing, by the processor 15, the image containing the speckle pattern T2 to obtain two-dimensional distance information, and details thereof have been illustrated above and thus are not repeated herein.

Step S53: Next, the processor 15 calculates a position (e.g., the position H1 shown in FIG. 6A) of a line section (e.g., filled with slant line) in the first image Im1 containing the line pattern T1, and compares the position with the information (e.g., LUT between positions and distances) stored in the memory to obtain a relative distance from the obstacle W1.

Step S55: During the cleaning robot 100 moving toward the obstacle W1, the processor 15 calculates the relative distance at a predetermined frequency (e.g., corresponding to the image capturing frequency). When identifying that the relative distance is shortened to be equal to a predetermined distance (e.g., a wall distance M which is set before shipment), the processor 15 controls the cleaning robot 100 to turn (left or right) the moving direction to be parallel to the obstacle W1, e.g., FIG. 6B showing a right turn being performed.

Step S57: Next, the cleaning robot 100 moves in a direction parallel to the obstacle W1 at a predetermined distance M therefrom as shown in FIG. 6B. Meanwhile, the first light source LD1 emits light to pass through the first DOE $113_{T1}$ to project the line pattern T1 toward a second direction (i.e. a direction parallel to the obstacle W1) at a distance Z.

Step S59: To maintain a parallel distance between the cleaning robot 100 and the obstacle W1 to be substantially identical to the predetermined distance M, the processor 15 continuously calculates the parallel distance according to a second image Im2 (referring to FIG. 6B) containing the line pattern T1 captured by the image sensor 13.

In one non-limiting embodiment, the image sensor 13 includes a linear pixel array (i.e. a length thereof much larger than a width) for capturing the second image Im2 Meanwhile, the image sensor 13 preferably has a wide-angle lens to allow a field of view (shown as 2θ) the image sensor 13 to be larger than a diameter of the cleaning robot 100. In this way, when the cleaning robot 100 moves in a direction parallel to the obstacle W1, the second image Im2 acquired by the image sensor 13 still contains the obstacle image, e.g., the region Pn shown in FIG. 6B indicating an image of the obstacle W1. When the cleaning robot 100 moves in a direction parallel to the obstacle W1 by the predetermined distance M, the image size (or pixel number) Pn will be substantially fixed, but when the parallel distance changes, the image size Pn also changes. Accordingly, the processor 15 further identifies whether the parallel distance is identical to the predetermined distance M according to the image size Pn of the obstacle W1 detected by the linear pixel array. When the parallel distance is not equal to the predetermined distance M, the processor 15 controls the cleaning robot 100 to adjust its moving direction to keep the predetermined distance M from the obstacle W1.

The method of controlling a moving direction of the cleaning robot 100 (i.e. controlling wheels by a motor) is known to the art and not a main objective of the present disclosure, and thus details thereof are not described herein.

In one non-limiting embodiment, the wide field of view of the image sensor 13 is determined according to a size (e.g., diameter W) of the cleaning robot 100, a projected distance Z of the line pattern T1 and a wall distance (i.e., the predetermined distance M) by triangular calculation, e.g., θ=arctan ((M+W/2)/Z). If the size W of the cleaning robot 100 is larger, the field of view 2θ becomes larger. In addition, the processor 15 preferably has the function of distortion compensation to eliminate the image distortion caused by the wide-angle lens.

Figure 7:
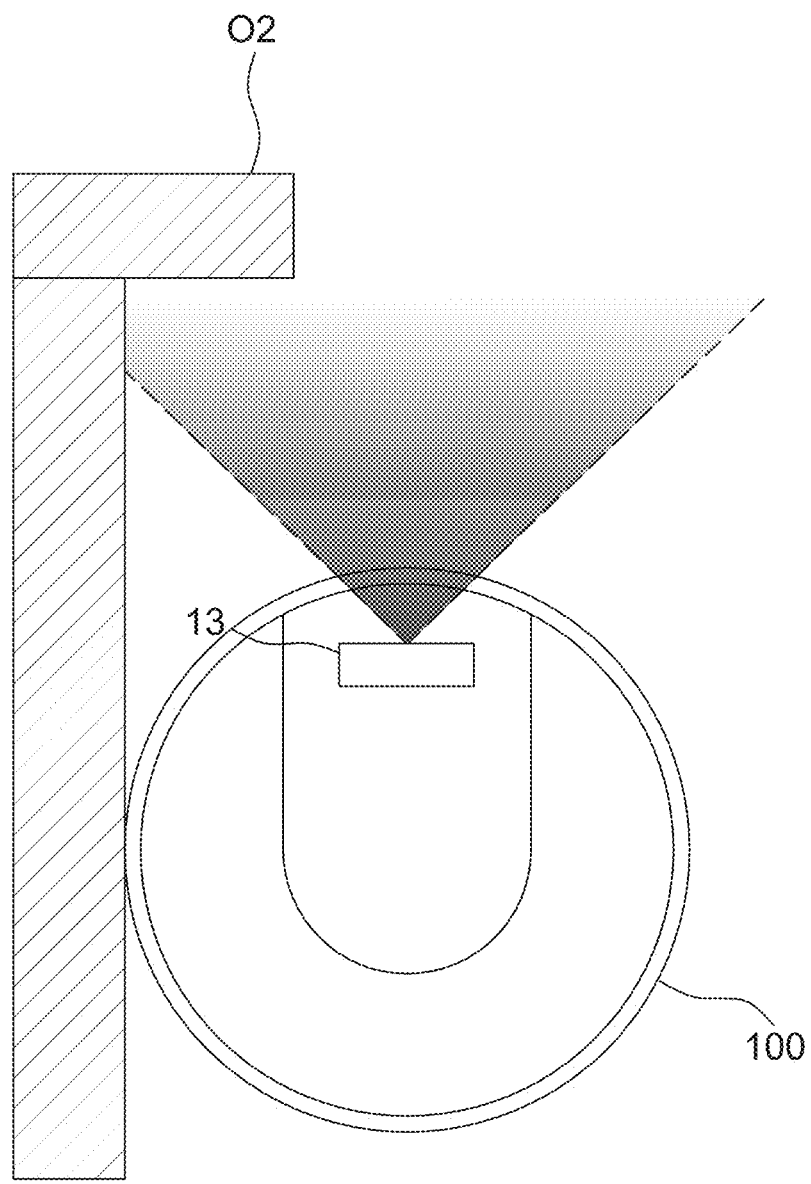
FIG. 7 is another operational schematic diagram of a cleaning robot according to one embodiment of the present disclosure.

In addition, as shown in FIG. 7, as the cleaning robot 100 of the present disclosure adopts a wide-angle lens, compared with the conventional robot using multiple sensors, the cleaning robot 100 can solve the problem of the existence of undetectable dead zone (e.g., FIG. 7 showing the image sensor 13 detecting an object O2 at front-left corner which is not detectable in the conventional robot) so as to reduce the bumping of the cleaning robot 100 with obstacles to prolong the service lifetime.

It should be mentioned that the "wall distance" mentioned in the above embodiments is not limited to a distance from a "wall". The "wall distance" is a distance from any obstacle having a large area such that the cleaning robot 100 cleans in a direction parallel to it.

Figure 8:
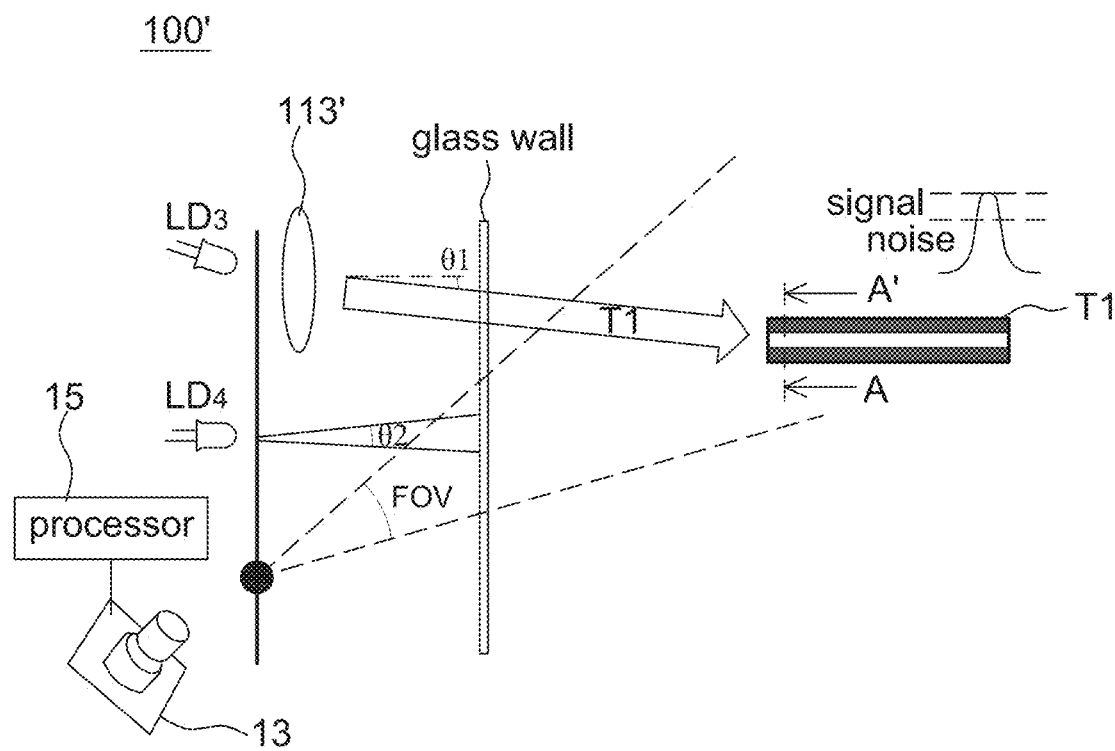
FIG. 8 is an operational schematic diagram of a cleaning robot according to an alternative embodiment of the present disclosure.

When an obstacle is transparent (e.g., a glass wall), a line pattern T1 projected by a cleaning robot can penetrate the transparent obstacle such that the processor 15 may not identify a relative distance from the transparent obstacle correctly. Therefore, the cleaning robot can bump into the transparent obstacle to generate noises and cause damage to the device itself or to the wall. Accordingly, the present disclosure further provides a cleaning robot 100' capable of identifying a relative distance from a transparent obstacle as shown in FIG. 8, and the cleaning robot 100' is turned its direction when the relative distance reaches a predetermined distance.

The cleaning robot 100' of the present disclosure includes a laser light source LD3, a diffractive optical element 113', a light emitting diode LD4, an image sensor 13 and a processor 15. In one non-limiting embodiment, the laser light source LD3 is implemented by the above first light source LD1, and the diffractive optical element 113' is implemented by the above first diffractive optical element $113_{T1}$, and thus details thereof are not repeated herein. In this embodiment, the laser light source LD3 projects a line pattern T1 toward a moving direction through the diffractive optical element 113'.

A dominant wavelength of light emitted by the light emitting diode LD4 is identical to or different from a dominant wavelength of light (e.g., 850 nm to 940 nm, but not limited to) emitted by the laser light source LD3. The light emitting diode LD4 illuminates light with an emission angle θ2 toward the moving direction. In one non-limiting embodiment, the laser light source LD3 projects a light pattern T1 toward the moving direction below a horizontal direction (i.e., having a dip angle θ1) such that when there is no obstacle in front of the cleaning robot 100', the line pattern T1 is projected on the ground on which the machine is moving. The light emitting diode LD4 illuminates light right ahead of the moving direction (i.e. no deep angle or elevation angle). In some embodiments, the light emitting diode LD4 is arranged to emit light toward the moving direction with a deep angle or an elevation angle smaller than 5 degrees.

The image sensor 13 is implemented by the above image sensor 13 which acquires images with a field of view FOV toward the moving direction. Accordingly, when the laser light source LD3 is lighting, the captured images contain an image of the line pattern T1. As mentioned above, the processor 15 calculates and identifies a relative distance form an obstacle according to an image of the line pattern T1 (e.g., according to the position P1 mentioned above).

The processor 15 is electrically coupled to the laser light source LD3 and the light emitting diode LD4 to control the laser light source LD3 and the light emitting diode LD4 to emit light in a predetermined frequency.

As mentioned above, this embodiment is used to identify a distance from a transparent obstacle. Accordingly, when there is no transparent obstacle in a moving direction of the cleaning robot 100', a signal-to-noise ratio (SNR) of an image (FIG. 8 showing an intensity distribution along line A-A') containing the line pattern T1 is within a predetermined threshold range (e.g., 50% to 70%, but not limited thereto). However, when there is a transparent obstacle in the moving direction of the cleaning robot 100', the signal-to-noise ratio of the image containing the line pattern T1 is lower than the predetermined threshold range. In addition, when there is a strong reflective obstacle in the moving direction of the cleaning robot 100', it is possible that the SNR of the image containing the line pattern T1 is higher than the predetermined threshold range. In this embodiment, when identifying that the SNR of the image containing the line pattern T1 exceeds (i.e. lower or higher than) the predetermined threshold range, the processor 15 identifies a distance from the obstacle according to an area of a bright region in the image captured when the light emitting diode LD4 is lighting.

Figure 9:
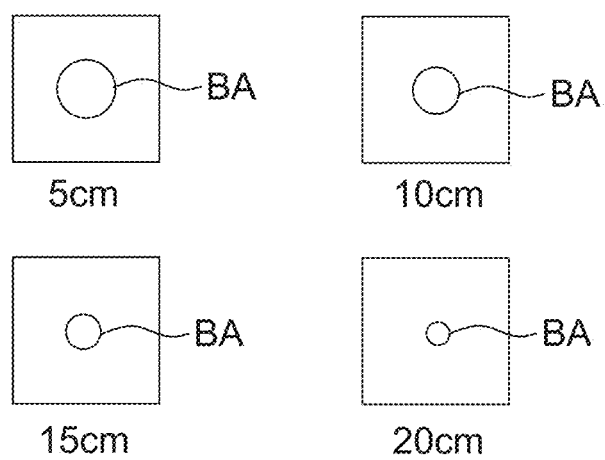
FIG. 9 is a schematic diagram of a bright region in an image associated with a light emitting diode captured by an image sensor in FIG. 8.

For example referring to FIG. 9, it shows a reflection image on a transparent obstacle captured by the image sensor 13 when the light emitting diode LD4 is emitting light, wherein the captured image contains a bright region BA associated with the light emitting diode LD4. It is seen from FIG. 9 that an area of the bright region BA has an opposite relationship with respect to a relative distance between the cleaning robot 100' and the transparent obstacle, i.e. the area of the bright region BA being smaller when the relative distance is farther. Accordingly, the processor 15 identifies a distance from the transparent obstacle according to the area of the bright region BA. For example, the processor 15 identifies the distance according to a lookup table (recorded in a memory) of the relationship between areas and corresponding relative distances. The bright region BA is determined according to pixels having a gray value larger than a threshold in the image.

In other words, in this embodiment, when the SNR of the image containing the line pattern T1 is within a predetermined threshold range, the processor 15 calculates a relative distance from the obstacle according to the image captured when the laser light source LD3 is emitting light; whereas, when the SNR of the image containing the line pattern T1 exceeds the predetermined threshold range, the processor 15 calculates a relative distance from the obstacle according to the image captured when the light emitting diode LD4 is emitting light. In one non-limiting embodiment, a dominant wavelength of light emitted by the light emitting diode LD4 is selected to have a higher reflectivity corresponding to a specific material (e.g., glass) to facilitate the distance detection.

Figure 10A:
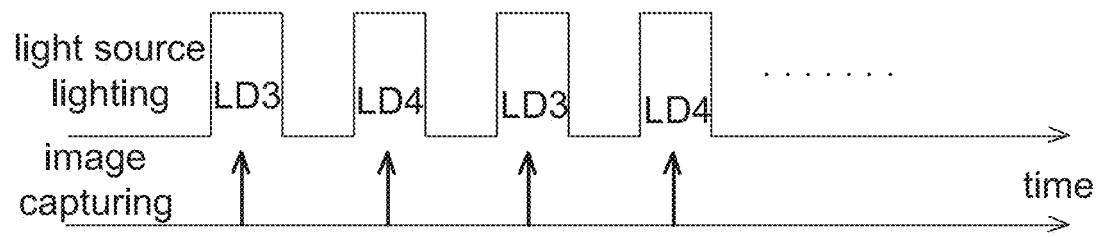
FIGS. 10A-10B are timing diagrams of lighting different light sources of the cleaning robot in FIG. 8.
Figure 10B:
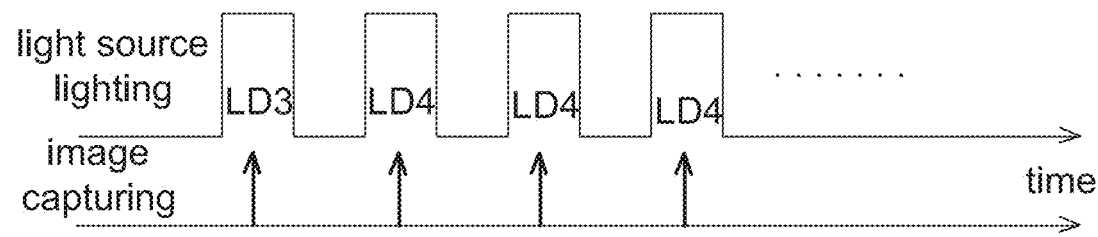

Referring to FIGS. 10A and 10B, in the embodiment of FIG. 8, the processor 15 firstly controls, in a normal mode, the laser light source LD3 to emit light at a lighting frequency, and calculates a relative distance from an obstacle according to the line pattern T1 in an image captured by the image sensor 13 (arrows in FIGS. 10A and 10B referred to capturing an image). When identifying that the SNR of the image containing the line pattern T1 is within a predetermined threshold range, the processor 15 only turns on the laser light source LD3 without turning on the light emitting diode LD4. When identifying that the SNR of the image containing the line pattern T1 exceeds the predetermined threshold range, the processor 15 alternatively turns on the laser light source LD3 and the light emitting diode LD4 (as shown in FIG. 10A), or only turns on the light emitting diode LD4 (as shown in FIG. 10B) to calculate a relative distance from the obstacle according to an area of the bright region BA in the image, which does not contain the line pattern T1. The normal mode is returned to turn on the laser light source LD3 again till the cleaning robot 100' turns its direction, i.e. the transparent obstacle no longer within the FOV of the image sensor 13. Or, when identifying that the SNR of the image containing the line pattern T1 exceeds the predetermined threshold range, the processor 15 selects to turn on the laser light source LD3 after turning on the light emitting diode LD4 for a predetermined time interval to identify the relation between the SNR of the image containing the line pattern T1 with respect to the predetermined threshold range to determine whether to turn on the light emitting diode LD4 continuously.

In addition, the embodiment of FIG. 8 is combinable to the above embodiments in FIG. 2, FIGS. 6A-6B and FIG. 7 to have functions of identifying a transparent obstacle, constructing 2D depth information and maintaining a wall distance. Different functions are realized as long as the processor 15 processes images captured corresponding to different light sources being turned on.

In the configuration of the cleaning robot 100 of FIG. 1, the light source module 11 is arranged at a position above the image sensor 13. In this configuration, when the work surface S has higher reflectivity (e.g., a tile surface, but not limited to) and the cleaning robot 100 is moving toward an obstacle (e.g., W1 shown in FIG. 6A), before the obstacle W1 enters a detectable range (e.g., projected distance Z, but not limited thereto), a line pattern (e.g., T1) is firstly reflected by the work surface S (first reflection) and then propagates toward the obstacle W1 after the first reflection to form a second reflection by the obstacle W1. Accordingly, the image acquired by the image sensor 13 can contain two line pattern images associated with the line pattern T1 to cause confusion and error identification.

Figure 11:
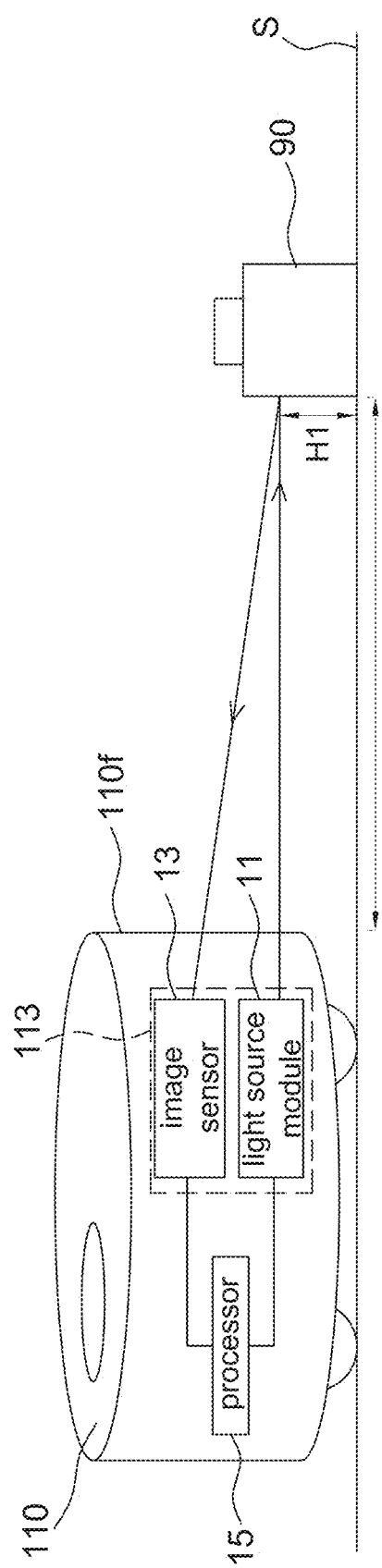
FIG. 11 is a schematic block diagram of a cleaning robot according to an alternative embodiment of the present disclosure.

Please refer to FIG. 11, it is a schematic block diagram of a cleaning robot 110 according to an alternative embodiment of the present disclosure. The cleaning robot 110 is also used to clean a work surface S by operating on the work surface S.

The cleaning robot 110 includes a light source module 11, an image sensor 13 and a processor 15, wherein the light source module 11, the image sensor 13 and the processor 15 are identical to those mentioned above, and thus they are indicated by identical reference numerals. The difference from the above embodiments is that in this embodiment the light source module 11 is arranged at a position below the image sensor 13 to eliminate the influence to obstacle detection from the material of work surface S.

As shown in FIG. 11, the cleaning robot 110 has a housing encapsulating the light source module 11, the image sensor 13 and the processor 15. The housing has a housing front edge 110f arranged at a side of the cleaning robot 110 toward the moving direction (e.g., right side in FIG. 11). The housing front edge 110f has, for example, an opening or a transparent plate opposite to the light source module 11 and the image sensor 13. The light source module 11 projects (via the opening or transparent plate) a horizontal line pattern, e.g., T1 shown in FIG. 2, toward the moving direction, wherein the horizontal line pattern is perpendicular to the housing front edge 110f. The image sensor 13 acquires an image of the horizontal line pattern T1 toward the moving direction.

In this embodiment, said horizontal means being parallel to the work surface S.

As mentioned above, the light source module 11 includes a diffractive optical element (e.g., $113_{T1}$ shown in FIG. 2) and a light source (e.g., a laser light LD1 shown in FIG. 2). The light source generates the horizontal line pattern T1 through the diffractive optical element, and details thereof have been illustrated above and thus are not repeated herein.

In one aspect, the housing front edge 110f is perpendicular to the moving direction such that the horizontal line pattern T1 does not project a light section on the work surface S. A light section is projected on an obstacle 90 when there is the obstacle 90 appearing on the work surface 90. It should be mentioned that in another aspect the housing front edge 110f is arranged with an tilted angle and not perpendicular to the moving direction, but the light source module 11 is still projects a horizontal line pattern T1 parallel to the work surface S.

A detectable size of the obstacle 90 becomes smaller when a height of the light source module 11 becomes lower. In one aspect, the light source module 11 is arranged inside the cleaning robot 110 and at a position lower than a half of a height of the cleaning robot 110 (or the housing front edge 110f), but the position of the image sensor 13 is not particularly limited as long as the image sensor 13 is arranged above the light source module 11 and a field of view thereof covers the horizontal line pattern T1.

In one aspect, the light source module 11 and the image sensor 13 are integrated in the same sensing module 113. For example, the light source module 11 and the image sensor 13 are encapsulated in the same package which has a first space containing the light source module 11, a second space containing the image sensor 13 and a light blocking wall between the first space and the second space thereby forming the sensing module 113. The sensing module 113 is arranged inside the cleaning robot 110 (i.e. inside the housing), and arranged at a position lower than a half of a height of the cleaning robot 110 (or the housing front edge 110f).

In another aspect, the sensing module 113 is arranged at (e.g., using a securing member or resin) a bottom surface of the cleaning robot 110 so as to further reduce the detectable size of the obstacle 90 thereby improving the detection performance. To adaptable to different work surfaces S, a height of the sensing module 113 is adjustable, automatically (e.g., according to a processed result of the image by the processor 15) or manually.

In the embodiment of FIG. 11, since the light source module 11 does not project a light section on the work surface S, the issue of distance identification of the cleaning robot 110 influenced by the material of work surface S is solved.

Figure 12:
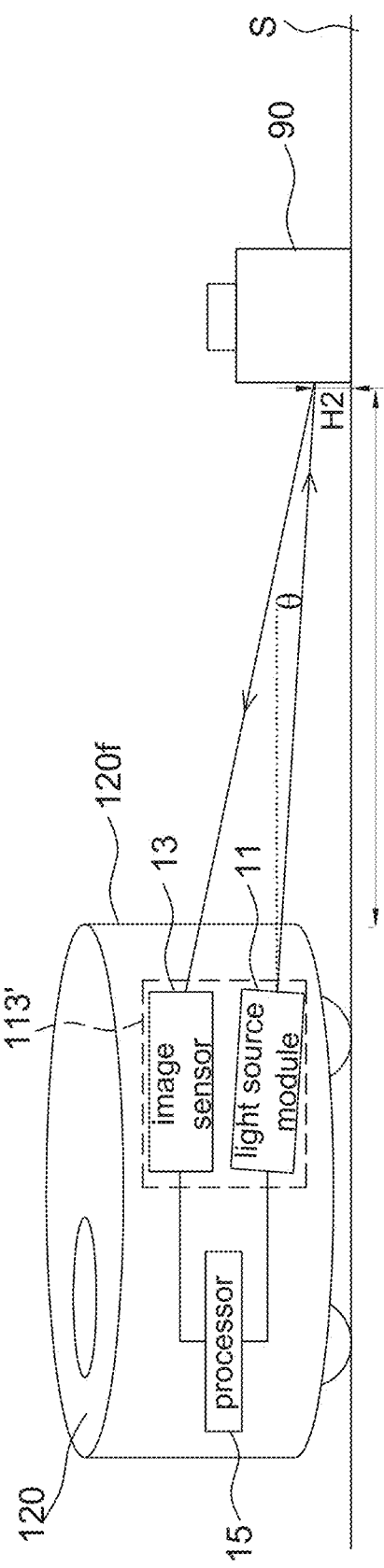
FIG. 12 is a schematic block diagram of a cleaning robot according to a further alternative embodiment of the present disclosure.

Please refer to FIG. 12, it is a schematic block diagram of a cleaning robot 120 according to a further alternative embodiment of the present disclosure. The cleaning robot 120 is also used to clean a work surface S by operating on the work surface S.

The cleaning robot 120 also includes a light source module 11, an image sensor 13 and a processor 15. In this embodiment, the light source module 11 is also arranged at a position lower than the image sensor 13 so as to eliminate the influence to the obstacle detection by the material of work surface S due to the second reflection of the horizontal line pattern.

The light source module 11 is used to project a horizontal line pattern (e.g., T1 shown in FIG. 2) on the work surface S at a predetermined distance in front of the moving direction. As shown in FIG. 12. when there is an obstacle 90 at a distance D in front of the moving direction, a height of the horizontal line pattern T1 projected on the obstacle 90 is lower than that in FIG. 11 such that a smaller obstacle 90 is detectable. If an inclined angle θ of the light source module 11 is larger, the height H2 is lower.

Similarly, the light source module 11 includes a diffractive optical element (e.g., $113_{T1}$ in FIG. 2) and a light source (e.g., laser light LD1 in FIG. 2), which forms the horizontal line pattern T1 through the diffractive optical element.

The image sensor 13 acquires an image of the horizontal line pattern T1 toward the moving direction. In one aspect, a field of view (e.g., FOV mentioned above) of the image sensor 13 is parallel to the work surface S as long as the horizontal line pattern T1 at the predetermined distance is covered by the field of view. In another aspect, the field of view of the image sensor 13 is inclined (e.g., with an angle θ, but not limited to) toward the work surface S.

Similar to FIG. 11, the light source module 11 in FIG. 12 is preferably arranged at a position lower than a half of a height of the cleaning robot 120 (or a housing front edge 1201), but the present disclosure is not limited thereto. Meanwhile, a position of the image sensor 13 is not particularly limited. Since the light source module 11 is arranged to project the horizontal line pattern T1 downward, the light source module 11 is arranged at a higher position (compared with FIG. 11). For example, if the light source module 11 is arranged higher, the inclined angle θ becomes larger such that the horizontal line pattern T1 is projected at the same predetermined distance. The predetermined distance is determined according to, for example, sensitivity of the image sensor 13 and intensity of the horizontal line pattern T1.

Similarly, in the aspect that the light source module 11 and the image sensor 13 are integrated in a sensing module 113' (similar to 113 described above), the sensing module 113' is arranged inside the cleaning robot 120 (i.e. a housing thereof), and at a position of a half of a height of the cleaning robot 120 (or the housing front edge 120f). In another aspect, the sensing module 113' is arranged at a bottom surface of the cleaning robot 120. As mentioned above, in some aspects, a vertical position of the sensing module 113' is adjustable.

The cleaning robot 110 of FIG. 11 and the cleaning robot 120 of FIG. 12 are combinable with the above cleaning robot 100 of FIG. 1 and the cleaning robot 110' of FIG. 8, i.e. exchanging positions of the upper light source module 11 and the lower image sensor 13 in FIG. 1 and FIG. 8. However, the method that the processor 15 controls the light source module 11 as well as the image sensor 13 (e.g., FIG. 4A to 4C), and the method of the processor 15 processing images are identical to those mentioned above. Meanwhile, in the aspect that the light source module 11 further includes a second light source LD2 and a second diffractive optical element $113_{T2}$, the second light source LD2 and the second diffractive optical element $113_{T2}$ are arranged above or below the image sensor 13 without particular limitations.

Figure 13A:
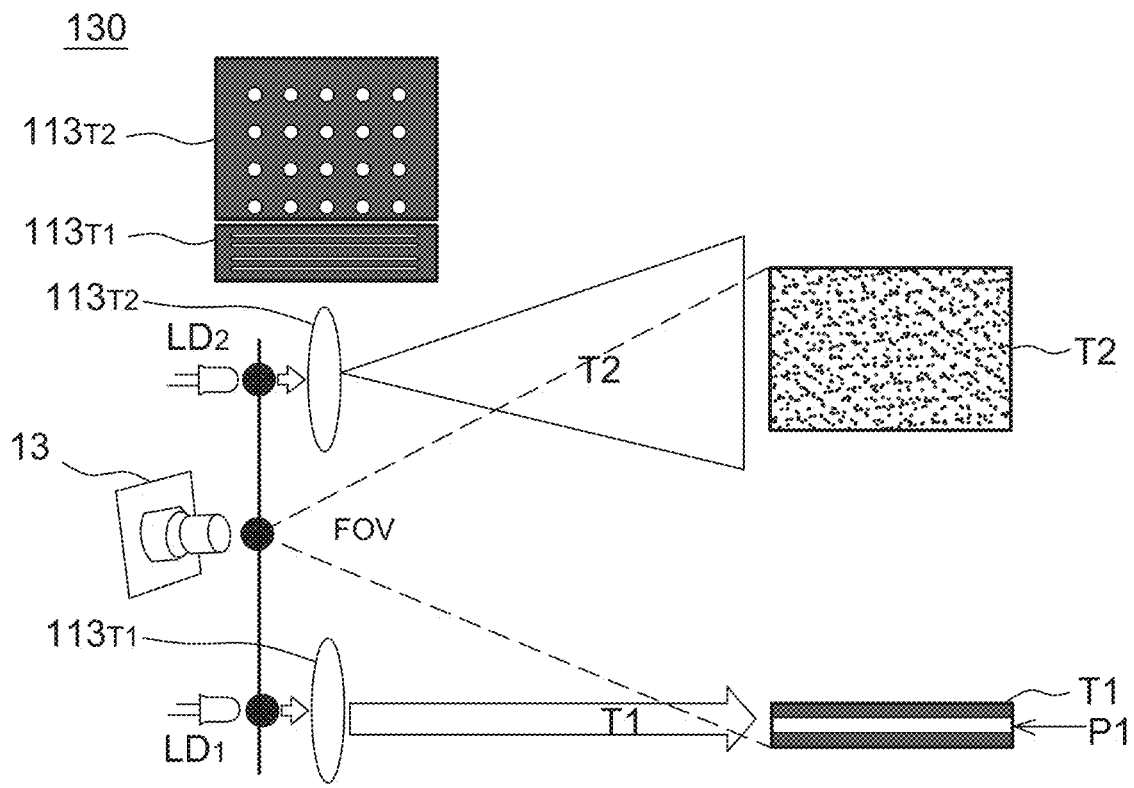
FIGS. 13A and 13B are schematic diagrams of element configuration of a cleaning robot according to some embodiment of the present disclosure.
Figure 13B:
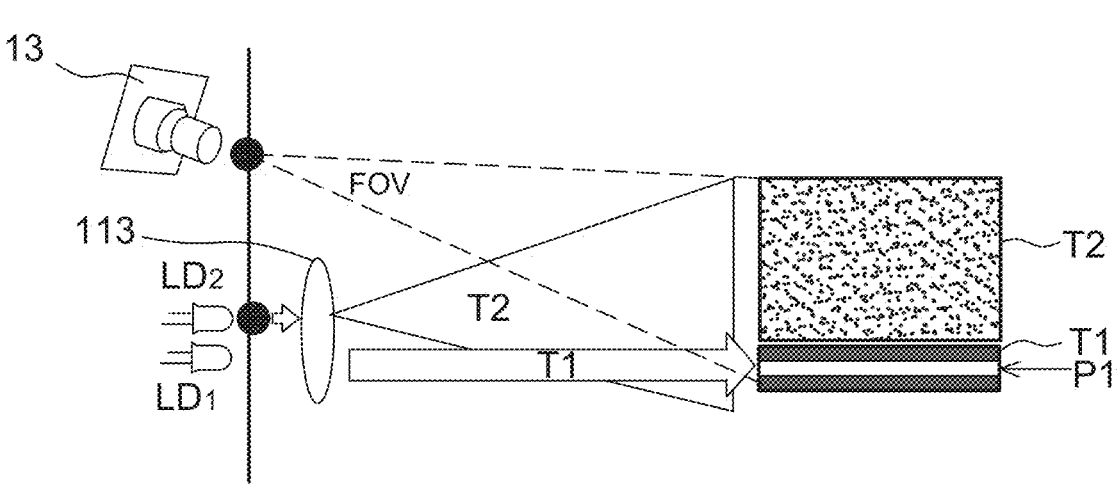

Please refer to FIGS. 13A and 13B, they are schematic diagrams of the element configuration of a cleaning robot according to some embodiments of the present disclosure. The cleaning robot 130 of FIG. 13A and the cleaning robot 130' of FIG. 13B include a first light source LD1 projecting a horizontal line pattern T1 via a first diffractive optical element $113_{T1}$ toward a moving direction, a second light source LD2 projecting a speckle pattern T2 via a second diffractive optical element $113_{T2}$ toward the moving direction, and an image sensor 13 used to acquire, toward the moving direction, an image of the horizontal line pattern T1 and an image of the speckle pattern T2, wherein the first light source LD1 is arranged at a position below the image sensor 13. Details of LD1, LD2 $113_{T1}$ and $113_{T2}$ have been illustrated above in conjunction with FIG. 2.

The position of the second light source LD2 is not particularly limited, and is arranged above the image sensor 13 (e.g., shown in FIG. 13A) or below the image sensor 13 (e.g., shown in FIG. 13B).

As mentioned above, the first light source LD1 projects the horizontal line pattern T1 parallel to the work surface S (e.g., shown in FIG. 11), or with an inclined angle toward the work surface S (e.g., shown in FIG. 12).

Furthermore, the processor 15 controls the first light source LD1 and the second light source LD2 in the same way mentioned above. For example, when identifying that there is no obstacle in the image of the horizontal line pattern T1, the processor 15 turns on the first light source LD1 but turns off the second light source LD2, and other controlling is illustrated above and thus details thereof are not repeated herein.

As mentioned above, the first light source LD1 and the second light source LD2 generate a horizontal line pattern T1 and a speckle pattern T2 using the diffractive optical element 113 shown in FIG. 2.

The present disclosure further provides a cleaning robot capable of identifying an inclined state (or whether a work surface S is horizontal or not). In another aspect, the cleaning robot further outputs an inclined angle for different applications. For example, in a forward inclined state, wheel driving force is decreased; and in a posterior inclined state, the wheel driving force is increased, but the present disclosure is not limited thereto.

For example, FIG. 11 shows that the cleaning robot moves forward on a horizontal work surface S. FIG. 14A shows that rear wheels of the cleaning robot are higher than front wheels in operation; and FIG. 14B shows that rear wheels of the cleaning robot are lower than front wheels in operation. These inclined states are generally caused by a non-horizontal work surface S or non-smoothed (e.g., existing low obstacles) work surface S.

In this embodiment, the light source module 11 projects a vertical (with respect to the work surface S) line pattern with an emission angle EA toward a moving direction, wherein the vertical line pattern is formed by using a light source (e.g., coherent light source or partially coherent light source) to emit light passing a diffractive optical element. The image sensor 13 has a field of view for acquiring an image of the vertical line pattern toward the moving direction, wherein the image sensor 13 has been illustrated above and thus is not repeated.

Firstly, an aspect that a part of the vertical line pattern is projected on a surface of the obstacle 90 (e.g., a wall) is described.

When the cleaning robot is moving on a horizontal work surface S (as shown in FIG. 11), the image sensor 13 acquires an image frame F as shown in FIG. 15A, wherein a first part of the vertical line pattern is on the work surface S and thus an image I1 thereof has a tilted section (lower part) in the image frame F, and a second part of the vertical line pattern is on a surface of the obstacle 90 and thus the image I1 thereof has a longitudinal section (upper part) in the image frame F.

When the cleaning robot is moving on a forward inclined work surface S (as shown in FIG. 14A), an emission angle EA moves closer to the cleaning robot on the work surface S, e.g., shown by a distance D2'. In this case, an image frame F acquired by the image sensor 13 is shown by FIG. 15B, wherein a shape of the image I1 of the vertical line pattern is changed to T2 to cause an associated image of the second part of the vertical line pattern among the image I2 to tilt leftward, e.g., in a case that the light source module 11 is arranged at a left side of the image sensor 13.

When the cleaning robot is moving on a posterior inclined work surface S (as shown in FIG. 14B), an emission angle EA moves farther away from the cleaning robot on the work surface S, e.g., shown by a distance D3'. In this case, an image frame F acquired by the image sensor 13 is shown by FIG. 15C, wherein a shape of the image I1 of the vertical line pattern is changed to I3 to cause an associated image of the second part of the vertical line pattern among the image I3 to tilt rightward, e.g., in the case that the light source module 11 is arranged at a left side of the image sensor 13.

In this embodiment, the processor 15 identifies whether the cleaning robot is forward inclined or posterior inclined according to a depth relationship (i.e. a distance from a left edge of the image frame F) of a connection point Pc between associated images of the first part as well as the second part in an image of the vertical line pattern and a predetermined point P2 of the associated image of the second part in the image of the vertical line pattern, wherein the predetermined point P2 is selected as a central point of the associated image of the second part, but not limited to. The predetermined point P2 may be a top point of the associated image of the second part in the image of the vertical line pattern.

As shown in FIG. 15A, when a distance $D_{C1}$ of the connection point Pc is equal to a distance $D_{W1}$ of the predetermined point P2, it means that the cleaning robot is not forward inclined or posterior inclined. As shown in FIG. 15B, when a distance $D_{C2}$ of the connection point Pc is larger than a distance $D_{W2}$ of the predetermined point P2, it means that the cleaning robot is forward inclined. As shown in FIG. 15C, when a distance $D_{C3}$ of the connection point Pc is smaller than a distance $D_{W3}$ of the predetermined point P2, it means that the cleaning robot is posterior inclined.

In another aspect, the processor 15 identifies whether the work surface S is a horizontal surface according to the distance variation of the connection point Pc and the predetermined point P2 from a right edge of the image frame F according to FIGS. 15A to 15C.

In the aspect that the light source module 11 is arranged at the right side of the image sensor 13, the processor 15 identifies an inclined state of the cleaning robot according to the distance variation of the connection point Pc and the predetermined point P2 from a right edge of the image frame F. In this aspect, in an operating state of FIG. 14A, an associated image of the second part of the vertical line pattern is tilted rightward; and in an operating state of FIG. 14B, an associated image of the second part of the vertical line pattern is tilted leftward. In this aspect, the processor 15 may also identify whether the work surface S is a horizontal surface according to the distance variation of the connection point Pc and the predetermined point P2 from a left edge of the image frame F.

Then, as aspect that the vertical line pattern is projected on the work surface S without on an obstacle 90 is described.

When the cleaning robot is working on a horizontal surface S (as shown in FIG. 11), an image frame F acquired by the image sensor 13 is shown in FIG. 16A, wherein an image I1 of the vertical line pattern is a tilted section in the image frame F. When the cleaning robot is working on a forward inclined surface S (as shown in FIG. 14A), an image frame F acquired by the image sensor 13 is shown in FIG. 16B, wherein an image I2 of the vertical line pattern is also a tilted section in the image frame F but a front end P thereof moves toward a left edge of the image frame F (e.g., the light source module 11 at the left side of the image sensor 13). When the cleaning robot is working on a posterior inclined surface S (as shown in FIG. 14B), an image frame F acquired by the image sensor 13 is shown in FIG. 16C, wherein an image I3 of the vertical line pattern is also a tilted section in the image frame F but a front end P thereof moves toward a right edge of the image frame F.

In this embodiment, the processor 15 identifies an inclined state of the cleaning robot according to a distance variation of a predetermined point (e.g., selected as a front end P, but not limited to) in an image of the vertical line pattern. As shown in FIG. 16A, when the cleaning robot is working on a horizontal work surface S (as shown in FIG. 11), a distance D1 of the predetermined point P from a left edge of the image frame F is previously obtained since a distance H1 between the light source module 11 and the work surface S is fixed, as shown in FIGS. 14A and 14B. As shown in FIG. 16B, when a distance D2 of the predetermined point P is smaller than D1, it means that the cleaning robot is operating on a forward inclined work surface S (as shown in FIG. 14A). As shown in FIG. 16C, when a distance D3 of the predetermined point P is larger than D1, it means that the cleaning robot is operating on a posterior inclined work surface S (as shown in FIG. 14B). In this way, only by comparing a distance of a predetermined point P from a left edge of the image frame F with a predetermined distance (e.g., D1), the processor 15 is able to identify whether the work surface S is horizontal or not.

Similarly, in the aspect that the light source module 11 is arranged at the right side of the image sensor 13, the processor 15 calculates a distance of a predetermined point P from a right edge of the image frame F to be compared with a predetermined distance. When the cleaning robot is working on a forward inclined work surface S, a front end P in the image frame F acquired by the image sensor 13 moves toward the right edge of the image frame F; whereas, when the cleaning robot is working on a posterior inclined work surface S, the front end P in the image frame F acquired by the image sensor 13 moves toward the left edge of the image frame F.

In the present disclosure, the processor 15 (e.g., a DSP or ASIC) outputs a flag signal to a post processor (e.g., MCU) of the cleaning robot to indicate a horizontal state, forward inclined state or a posterior inclined state.

In addition, the processor 15 further calculates an inclined angle. As mentioned above, it is assumed that a height of the light source module 11 is fixed as H1. The processor (with embedded algorithm) 15 calculates $\tan^{-1}$ (D2/H1) as a forward inclined angle of the cleaning robot, wherein D2 is corresponding to a distance D2' of a nearest illuminated point of the emission angle EA on the work surface S. The processor 15 calculates $\tan^{-1}$ (D3/H1) as a posterior inclined angle of the cleaning robot, wherein D3 is corresponding to a distance D3' of a nearest illuminated point of the emission angle EA on the work surface S. The post processor of the cleaning robot performs corresponding controls according to the forward inclined angle or the posterior inclined angle corresponding to different applications.

Furthermore, it should be mentioned that although above embodiments are illustrated in the way that the light source module 11 is below the image sensor 13, the present disclosure is not limited thereto. The cleaning robot capable of identifying whether a work surface S is horizontal is also arranged in a way that the light source module 11 is above the image sensor 13 to project a vertical line pattern toward the moving direction.

It should be mentioned that the above different embodiments are combinable to form an optical cleaning robot capable of eliminating reflection interference from a work surface or an obstacle surface, and identify whether the work surface is horizontal or not.

The present disclosure further provides an optical cleaning robot that uses two window-of-interests (WOI) of mage frames to eliminate the interference from second reflection in the operating environment. This embodiment is also described using the cleaning robot 110 in FIG. 11 as an example. The cleaning robot 110 includes a light source module 11, an image sensor 13 and a processor 15, and details thereof have being illustrated above and thus are not repeated herein. Functions of these elements are described hereinafter.

Figure 18:
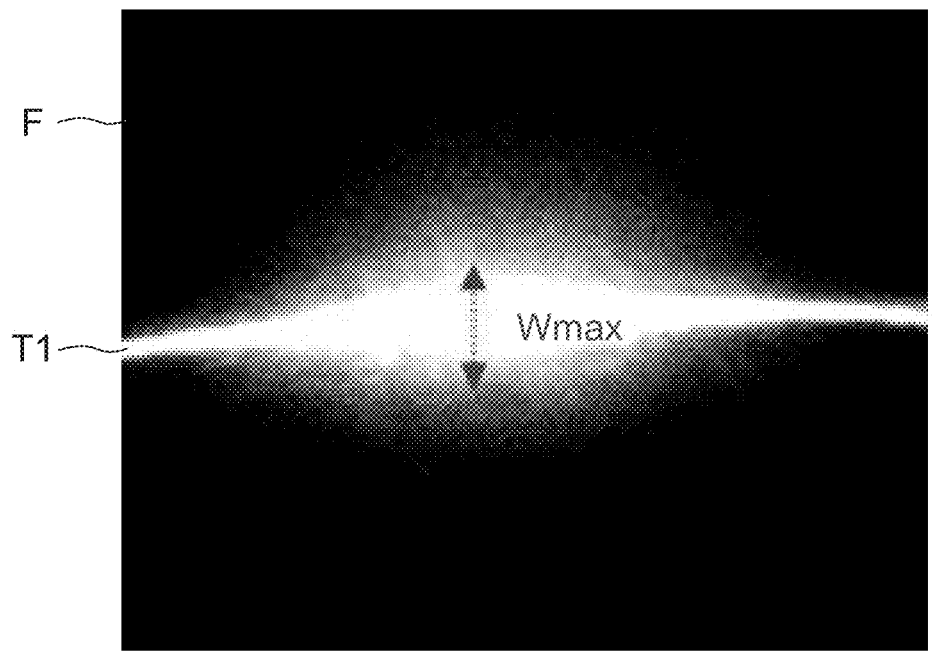
FIG. 18 is a schematic diagram of an image of line pattern captured by a cleaning robot according to a further embodiment of the present disclosure.

As mentioned above, the light source module 11 projects a horizontal line pattern toward a moving direction; and the image sensor 13 captures image frames F, e.g., referring to FIG. 18, containing the horizontal line pattern toward the moving direction using a frame rate.

In capturing the image frames F, the image sensor 13 uses an analog gain (e.g., by IPGA) to amplify pixel data sensed by a pixel array thereof. The interference due to second reflection (if existing) of the horizontal line pattern is more serious when the analog gain is larger. In the present disclosure, the processor 15 determines the analog gain according to a maximum line width Wmax of a line pattern image, e.g., shown as T1 in FIG. 18.

Figure 17:
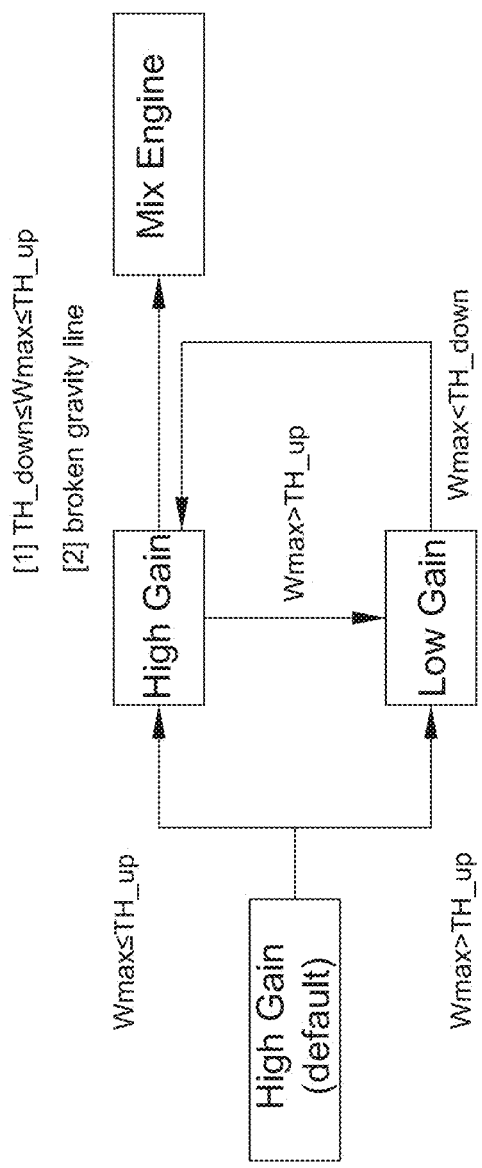
FIG. 17 is a schematic diagram of the gain adjustment of a cleaning robot according to a further embodiment of the present disclosure.

For example referring to FIG. 17, the image sensor 13 is pre-set to use a high gain value to capture image frames F to maintain a longer detecting distance. In this embodiment, the high gain value is set as 5 to 9 times of a low gain value, which is determined according to previous measurement. For example, the low gain value is set to cause a second reflection of the horizontal line pattern is not significant, e.g., intensity being lower than a threshold, event operating on a work surface having high reflectivity. Therefore, when the image sensor 13 captures image frames F using the low gain value, it is considered that there is no interference from the second reflection.

When the maximum line width Wmax is smaller than a high threshold TH_up, the high gain value is continuously used to capture image frames F; whereas, when the maximum line width Wmax is larger than the high threshold TH_up, it means that intensity of the line pattern image T1 is too large and thus the low gain value is used to capture image frames F.

In capturing image frames F using the low gain value, when the maximum line width Wmax is smaller than a low threshold TH_down, it means that intensity of the line pattern image T1 is too weak and thus the high gain value is used to capture image frames F.

More specifically, the processor 15 controls or adjusts an analog gain of the image sensor 13 according to the maximum line width Wmax of the line pattern image T1 in the image frame F.

Furthermore, the processor 15 uses a mix engine (implemented by software, hardware and/or firmware) to perform the image combining or mixing to generate an output gravity line to accordingly calculate a distance/depth of an obstacle (e.g., 90 shown in FIG. 11). In the present disclosure, the mix engine is triggered or enabled when (1) the maximum line width Wmax is between the high threshold TH_up and the low threshold TH_down, and (2) a gravity line of the image frame F is a broken line (examples being given below for illustration).

In one aspect, the mix engine is included in the processor 15, and the mix engine is shown independently herein for illustration purpose. The mix engine (or the processor 15) is used to combine a first gravity line and a second gravity line to generate an output gravity line, wherein the first gravity line is a gravity line of a first line pattern image within a first WOI in a first image frame, and the second gravity line is a gravity line of a second line pattern image within a second WOI in a second image frame. Please refer to FIG. 18 again, it is seen that a line pattern image T1 is not formed by a single pixel in a longitudinal direction. To determine a position of the line pattern image T1 in the longitudinal direction, the processor 15 is arranged to calculate a gravity center of multiple pixels (e.g., intensity higher than a threshold) of the line pattern image T1 at the same pixel column. The gravity center of the line pattern image T1 at every pixel column forms the gravity line, i.e. indicating a position of the line pattern image T1.

Figure 19:
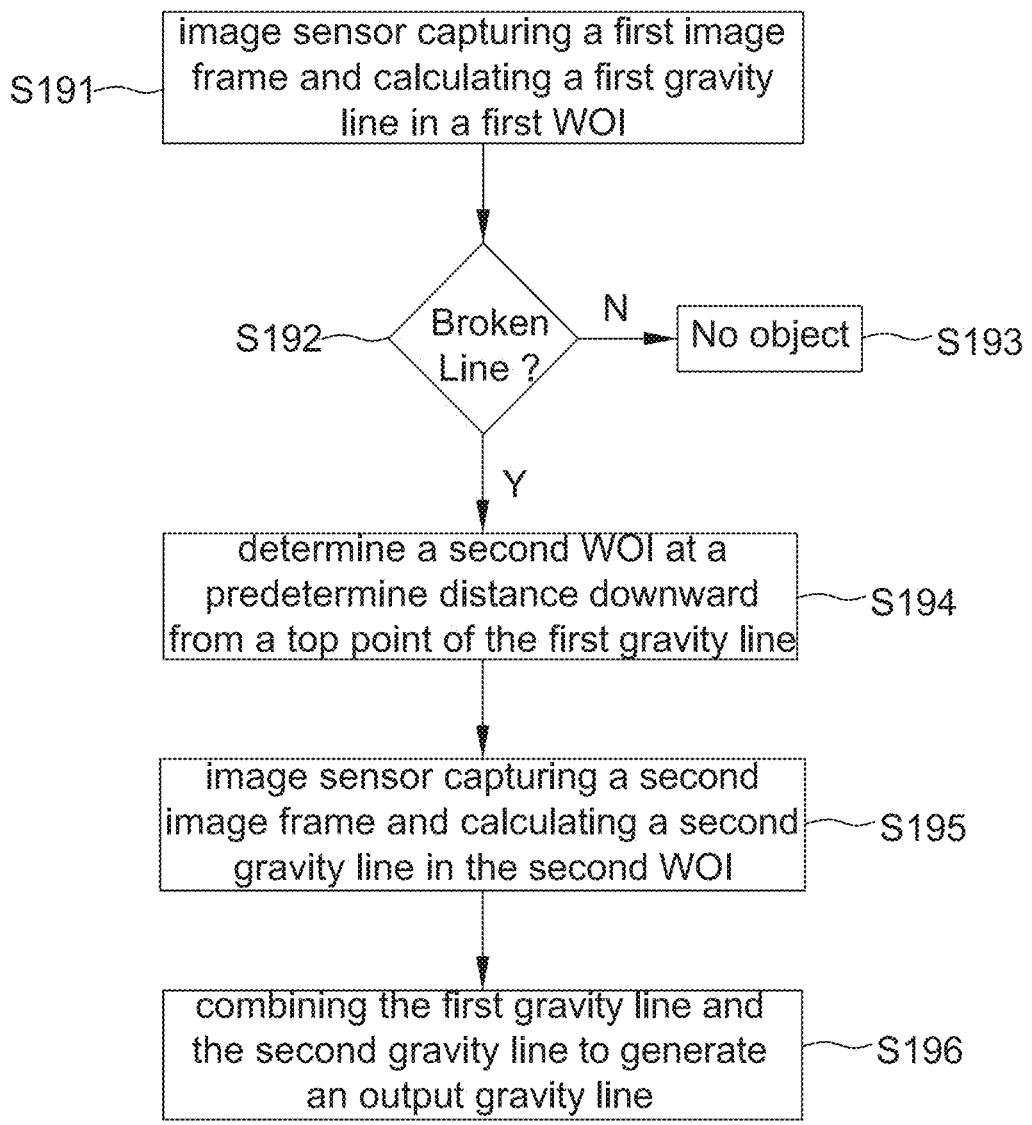
FIG. 19 is a flow chart of an operating method of a cleaning robot according to a further embodiment of the present disclosure.

Please refer to FIG. 19, it is a flow chart of an operating method of a cleaning robot 110 according to one embodiment of the present disclosure, including the steps of: capturing a first image frame, by an image sensor, and calculating a first gravity line in a first WOI (Step S191); identifying line broken or not (Step S192); if no, meaning no obstacle and not calculating an object distance (Step S193); if yes, determining a second WOI at a predetermined distance downward from a top point of the first gravity line (Step S194); capturing a second image frame, by the image sensor, and calculating a second gravity line in a second WOI (Step S195); and combining the first gravity line and the second gravity line to generate an output gravity line (Step S196).

Please refer to scenarios in FIGS. 20A to 20D to illustrate the operating method of FIG. 19. It is appreciated that scenarios of the operating method of FIG. 19 are not limited to those shown in FIG. 20A to 20D.

As mentioned above, the operating method in FIG. 19 is performed only when the maximum line width Wmax is within a predetermined range, and there is an obstacle 90 in front, referring to FIG. 17.

Figure 20A:
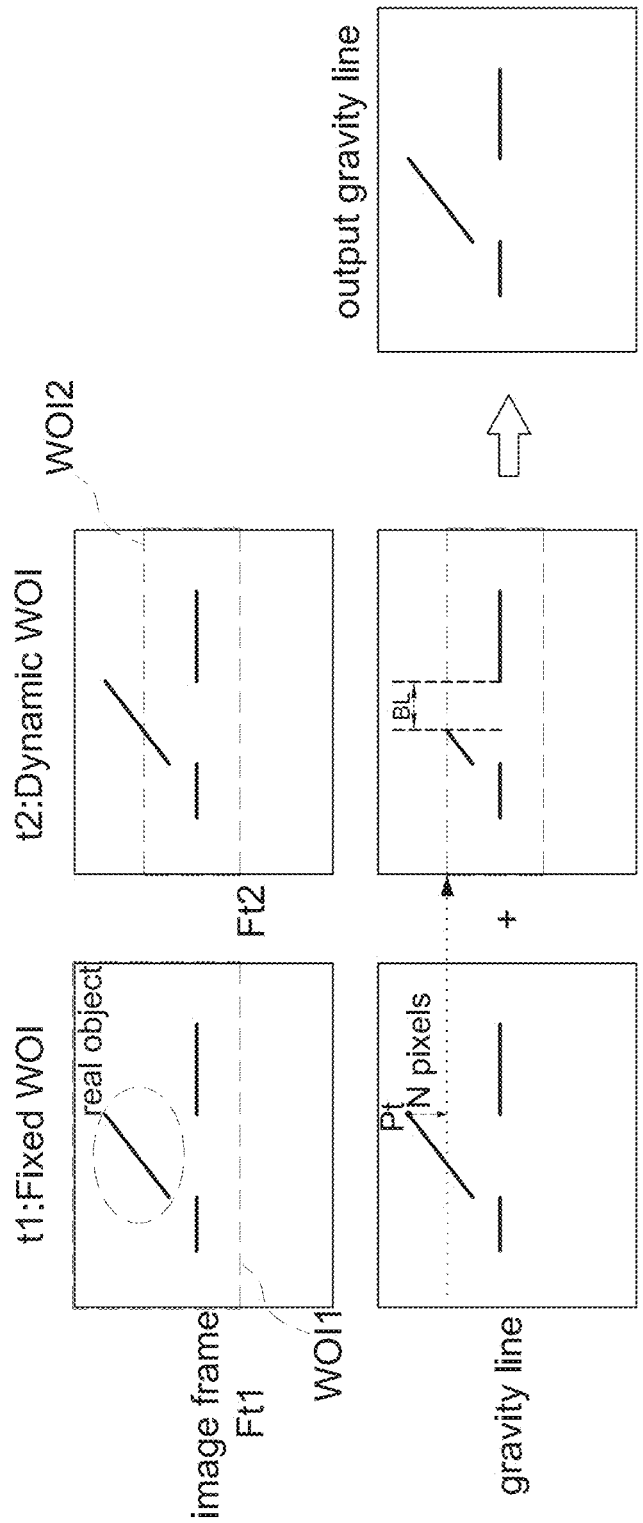
FIGS. 20A to 20D are schematic diagrams of the operating method in FIG. 19 according to some embodiments of the present disclosure.
Figure 20B:
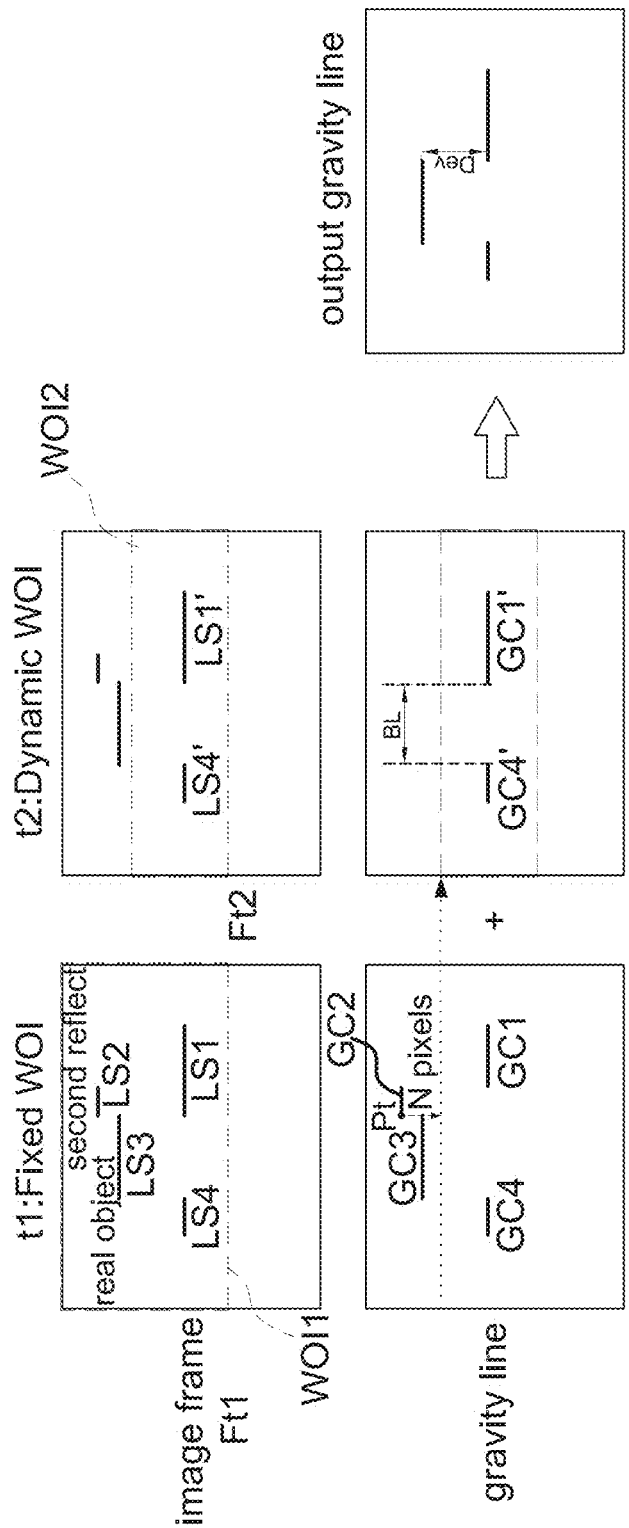

Step S191: Firstly, the image sensor 13 captures a first image frame Ft1. The processor 15 calculates a first gravity line in a first window-of interest WOI1. In FIG. 20A for instance, the first image frame Ft1 contains a line pattern image (tilted line section) projected on a real object and line pattern images (horizontal line sections) projected on a work surface, and the processor 15 calculates gravity lines of these line pattern images (shown in lower left diagram). In FIG. 20B for instance, the first image frame Ft1 contains a line pattern image LS3 projected on a real object, a line pattern image LS2 of second reflection and line pattern images LS1 and LS4 projected on a work surface, and the processor 15 calculates gravity lines of these line pattern images (shown in lower left diagram), including GC1, GC2, GC3 and GC4. It is appreciated that whether a line pattern projected on an obstacle 90 being a horizontal line or a tilted line is determined according to a relative position between the obstacle 90 and the cleaning robot 110.

In one aspect, WOI1 is a fixed pixel region previously determined according to a detection range of the cleaning robot 110. For example, a position of the horizontal line pattern image in the image frame F is previously determined according to an projecting angle of the light source module 11 and a field of view of the image sensor 13, to accordingly determine the WOI1, which is selected to be smaller than a size of the image frame F but covering the farthest detectable distance. In this embodiment, a higher position in the image frame F means closer to the cleaning robot 110.

In the present disclosure, the processor 15 is arranged to calculate the gravity line by calculating gravities of a line pattern image having higher intensity. For example in FIG. 20B, the first image frame Ft1 contains line pattern images LS1 and LS2 appearing in the same longitudinal region. If the intensity of LS1 is higher than that of LS2, the processor 15 will ignore LS2 associated with second reflection in calculating the gravity line such that the calculated gravity line is not interfered by the second reflection. However, if the intensity of LS1 is weaker than that of LS2, the calculated gravity line will contain a gravity line GC2 associated with the second reflection, as shown in lower left diagram in FIG. 20B, wherein it is seen that GC1 is shorter than LS1 by a length of GC2, which is associated with the second reflection.

It is appreciated that the intensity of LS2 is determined according to the material of a reflected surface projected with the horizontal line pattern.

Step S192: Next, the processor 15 identifies whether a gravity line calculated from the first image frame Ft1 or a line pattern image is broken line or not. If the gravity line or the line pattern image is not broken, the Step S193 is entered meaning that no obstacle is identified such that an object distance is not calculated.

Step S194: If the gravity line or the line pattern image is a broken line, the mix engine starts operating. The processor 15 determines a second window-of-interest WOI2 according to a predetermined distance (shown as N pixels) downward from a top point Pt of the first gravity line. If the first gravity line is a horizontal line, the top point Pt is any point of the first gravity line. More specifically, the processor 15 determines an upper edge of WOI2 according to the top point Pt and the predetermined distance. In one aspect, a lower edge of WOI1 is selected to be identical to that of WOI2, and only the upper edge is changed (assuming that a position of the second reflection is closer than the obstacle 90), but the present disclosure is not limited thereto. Furthermore, the predetermined distance is a fixed value previously determined or a varied value which is determined according to a position of the top point Pt. For example, if the position of the top point Pt is higher, a larger pixel distance (e.g., a number of N) is selected; on the contrary, a smaller pixel distance is selected when the position of the top point Pt is lower.

Step S195: Next, the image sensor 13 captures a second image frame Ft2, wherein t1 and t2 indicate two different time points. The processor 15 calculates a second gravity line in WOI2, i.e. ignoring information in the second image frame Ft2 outside WOI2. In FIG. 20A for instance, the second image frame Ft2 covers a line pattern image (partial tilted line section) projected on a real object and line pattern images (horizontal line sections) projected on a work surface, and the processor 15 also calculates gravity lines of these line pattern images (shown in lower center diagram). In FIG. 20B for instance, the second image frame Ft2 covers only line pattern images LS1' and LS4' projected on a work surface, and the processor 15 also calculates gravity lines, including GC1' and GC4' (shown in lower center diagram) without containing interference from second reflection.

Step S196: Finally, the processor 15 combines or mixes the gravity line calculated according to the second image frame Ft2 (lower center diagram) and the gravity line calculated according to the first image frame Ft1 (lower left diagram) to generate an output gravity line (right diagram). The combining and mixing is performed by using the gravity line calculated according to the second image frame Ft2, in which interference from second reflection being eliminated, as a basis to add a gravity line section from the gravity line associated with the first image frame Ft1 corresponding to a missing part (e.g., shown as BL) in the gravity line associated with the second image frame Ft2. For example in FIG. 20B, the output gravity line is consisted of line sections GC1' and GC4' (appearing in the second gravity line) as well as GC3 (appearing in the first gravity line), which is corresponding to BL. Because GC2 is not included in the output gravity line, the interference from second reflected is removed.

Figure 20C:
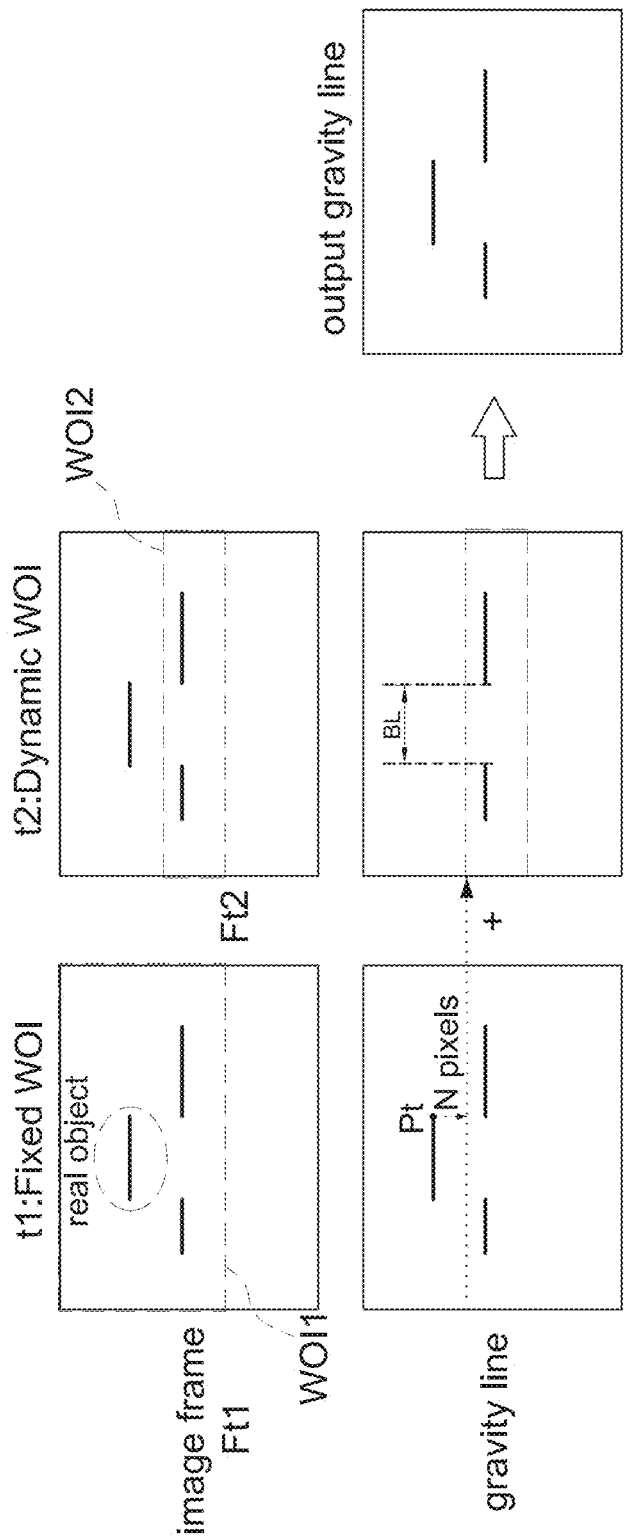

The operation shown in FIG. 20C is similar to FIG. 20B only no gravity line caused by second reflection being contained in FIG. 20C, and thus details thereof are not repeated herein.

Figure 20D:
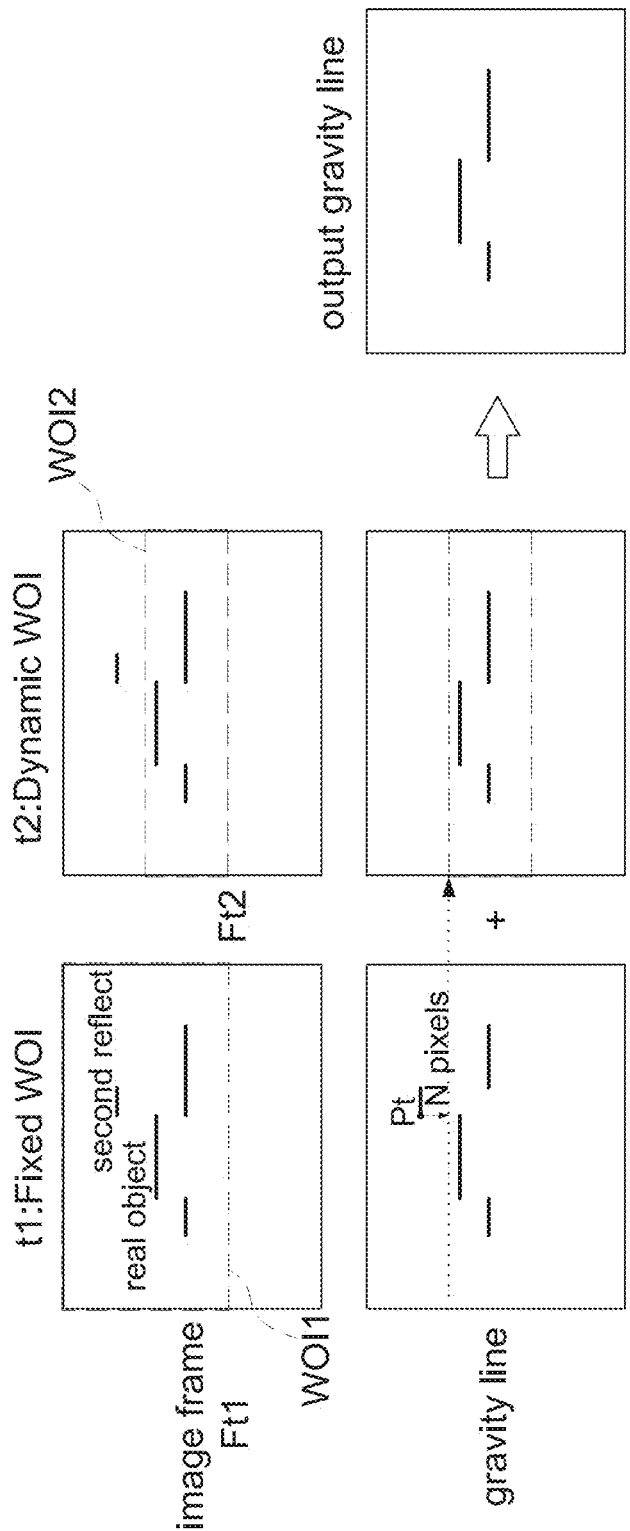

In FIG. 20D, because the gravity line calculated from the second image frame Ft2 only removes (by dynamically determining WOI2) a gravity line section caused by the second reflection, the gravity line calculated from the second image frame Ft2 is identical to the output gravity line since there is no missing part in the second gravity line. It is seen that the interference from the second reflection is effectively removed from FIGS. 20B and 20D.

Finally, the processor 15 calculates an object distance according to the output gravity line and performs corresponding control(s), e.g., obstacle avoidance. The method of calculating the object distance is performed, for example, according to a deviation (e.g., Dev shown in FIG. 20B) between a shifted gravity line and a reference gravity line (e.g., associated with a gravity line of horizontal line pattern on a work surface), wherein the processor 15 previously knows a depth corresponding to the reference gravity line.

It should be mentioned that the above different embodiments are combinable to implement an optical cleaning robot capable of eliminating reflection interference from a work surface or an obstacle surface, and identifying whether the work surface is a horizontal surface or not.

As mentioned above, the first light source LD1 and the second light source LD2 respectively generate the horizontal line patter T1 and speckle pattern T2 via the diffractive optical element 113 shown in FIG. 2.

It should be mentioned that although the above embodiments are illustrated using a cleaning robot as an example, the present disclosure is not limited thereto. The structure and operating method in each of the above embodiments are adaptable to various electronic devices that use images captured by an image sensor to perform navigation.

As mentioned above, obstacle detection of the conventional cleaning robot can be affected by the material of work surface to cause the acquired image containing two line pattern images even though a single line pattern is projected thereby leading to misidentifying an obstacle distance. Accordingly, the present disclosure further provides a cleaning robot capable of eliminating reflection interference (e.g., FIGS. 11-12) in which a light source position is arranged to be lower than an image sensor such that the image sensor does not detect a second reflected image of the projected line pattern thereby eliminating the influence to distance identification from the material of work surface.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A cleaning robot, comprising:
   a housing front edge, located on a side of the cleaning robot toward a moving direction;
   a light source module, configured to project a horizontal line pattern toward the moving direction and perpendicular to the housing front edge; and
   an image sensor, configured to acquire an image of the horizontal line pattern toward the moving direction, wherein the light source module is arranged at a position lower than the image sensor.

2. The cleaning robot as claimed in claim 1, wherein the light source module comprises:
   a diffractive optical element; and
   a light source, configured to project the horizontal line pattern through the diffractive optical element.

3. The cleaning robot as claimed in claim 1, wherein the housing front edge is perpendicular to the moving direction.

4. The cleaning robot as claimed in claim 1, wherein the light source module and the image sensor are integrated in a sensing module, which is arranged inside the cleaning robot and at a position lower than a half of a height of the cleaning robot.

5. The cleaning robot as claimed in claim 1, wherein the light source module and the image sensor are integrated in a sensing module, which is arranged at a bottom surface of the cleaning robot.

6. The cleaning robot as claimed in claim 5, wherein a vertical position of the sensing module is adjustable.

7. A cleaning robot, comprising:
   a light source module, configured to project a horizontal line pattern on a work surface at a predetermined distance in a moving direction; and
   an image sensor, configured to acquire an image of the horizontal line pattern toward the moving direction, wherein the light source module is arranged at a position lower than the image sensor.

8. The cleaning robot as claimed in claim 7, wherein the light source module comprises:
   a diffractive optical element; and
   a light source, configured to project the horizontal line pattern through the diffractive optical element.

9. The cleaning robot as claimed in claim 7, wherein a field of view of the image sensor is inclined toward the work surface.

10. The cleaning robot as claimed in claim 7, wherein a field of view of the image sensor is parallel to the work surface.

11. The cleaning robot as claimed in claim 7, wherein the light source module and the image sensor are integrated in a sensing module, which is arranged inside the cleaning robot and at a position lower than a half of a height of the cleaning robot.

12. The cleaning robot as claimed in claim 7, wherein the light source module and the image sensor are integrated in a sensing module, which is arranged at a bottom surface of the cleaning robot.

13. The cleaning robot as claimed in claim 12, wherein a vertical position of the sensing module is adjustable.

14. A cleaning robot, comprising:
   a first light source, configured to project a horizontal line pattern toward a moving direction via a first diffractive optical element;
   a second light source, configured to project a speckle pattern toward the moving direction via a second diffractive optical element; and
   an image sensor, configured to acquire, toward the moving direction, an image of the horizontal line pattern and an image of the speckle pattern, wherein the first light source is arranged at a position lower than the image sensor.

15. The cleaning robot as claimed in claim 14, wherein the second light source is arranged at a position lower than or higher than the image sensor.

16. The cleaning robot as claimed in claim 14, wherein the first light source is configured to project the horizontal line pattern toward the moving direction parallel to a work surface.

17. The cleaning robot as claimed in claim 14, wherein the first light source is configured to project the horizontal line pattern toward the moving direction inclined toward a work surface.

18. The cleaning robot as claimed in claim 14, further comprising a processor configured to identify whether there is an obstacle according to the image of the horizontal line pattern, wherein the processor is configured to turn on the first light source but turn off the second light source upon identifying no obstacle in the image of the horizontal line pattern.

* * * * *